United States Patent [19]
Robotham et al.

[11] Patent Number: 6,160,907
[45] Date of Patent: Dec. 12, 2000

[54] ITERATIVE THREE-DIMENSIONAL PROCESS FOR CREATING FINISHED MEDIA CONTENT

[75] Inventors: John S. Robotham, Belmont; Michael T. French, Newburyport, both of Mass.; Curt A. Rawley, Windham, N.H.

[73] Assignee: SynaPix, Inc., Lowell, Mass.

[21] Appl. No.: 08/948,865

[22] Filed: Oct. 10, 1997

Related U.S. Application Data

[60] Provisional application No. 60/043,075, Apr. 7, 1997.

[51] Int. Cl.[7] ....................................... G06K 9/00
[52] U.S. Cl. ..................... 382/154; 382/282; 382/285; 345/419; 345/420; 345/435; 345/473
[58] Field of Search ................... 382/282, 284, 382/285, 154, 299, 308, 278, 173; 345/418, 420, 419, 421, 425, 426, 430, 431, 432, 473, 474

[56] References Cited

U.S. PATENT DOCUMENTS

| | | | |
|---|---|---|---|
| 3,947,833 | 3/1976 | Eckstein, Jr. | 340/258 R |
| 3,970,841 | 7/1976 | Green | 250/201 |

(List continued on next page.)

FOREIGN PATENT DOCUMENTS

| | | |
|---|---|---|
| 0794516A2 | 3/1997 | European Pat. Off. . |
| 93/07554 | 4/1993 | WIPO . |
| 93/21636 | 10/1993 | WIPO . |
| 96/31047 | 10/1996 | WIPO . |
| 96/31979 | 10/1996 | WIPO . |
| 97/03416 | 1/1997 | WIPO . |

OTHER PUBLICATIONS

Thalmann, N.M., and Thalmann, D., "Virtual Actors Living in a Real World," *IEEE*, pp. 19–29, (1995).

Blondé, L., et al., "A Virtual Studio for Live Broadcasting: The Mona Lisa Project," *IEEE MultiMedia*, pp. 18–28, (Summer 1996).

(List continued on next page.)

*Primary Examiner*—Matthew Bella
*Assistant Examiner*—Kanji Patel
*Attorney, Agent, or Firm*—Hamilton, Brook, Smith & Reynolds, P.C.

[57] ABSTRACT

An integrated media production technique for refining a finish quality media content. The technique permits a media production to be defined as a computerized choreography model of a virtual stage containing data objects representing live/recorded image elements as well as synthetic-abstract elements and multiple versions thereof. Elements of the choreography model are iteratively rendered, blended, adjusted, and selected until a desired quality result is achieved.

55 Claims, 7 Drawing Sheets

U.S. PATENT DOCUMENTS

| | | |
|---|---|---|
| 4,175,860 | 11/1979 | Bacus ......................................... 356/39 |
| 4,385,322 | 5/1983 | Hubach et al. ........................... 358/221 |
| 4,620,318 | 10/1986 | Hill ............................................. 382/2 |
| 4,639,768 | 1/1987 | Ueno et al. ................................ 358/22 |
| 4,646,229 | 2/1987 | Boyle ....................................... 364/200 |
| 4,661,986 | 4/1987 | Adelson ..................................... 382/41 |
| 4,667,221 | 5/1987 | Cawley et al. ............................. 358/22 |
| 4,682,300 | 7/1987 | Seto et al. ................................ 364/571 |
| 4,685,146 | 8/1987 | Fenster et al. ............................. 382/54 |
| 4,692,806 | 9/1987 | Anderson et al. ....................... 358/209 |
| 4,703,514 | 10/1987 | van der Wal ............................. 382/41 |
| 4,706,296 | 11/1987 | Pedotti et al. ............................. 382/42 |
| 4,835,532 | 5/1989 | Fant ......................................... 340/728 |
| 4,847,688 | 7/1989 | Nishimura et al. ...................... 358/125 |
| 4,849,746 | 7/1989 | Dubner .................................... 340/728 |
| 4,858,000 | 8/1989 | Lu ............................................. 358/84 |
| 4,864,394 | 9/1989 | Gillard .................................... 358/105 |
| 4,868,766 | 9/1989 | Oosterholt .............................. 364/522 |
| 4,870,692 | 9/1989 | Zuiderveld et al. ........................ 382/6 |
| 5,058,042 | 10/1991 | Hanna et al. ............................ 364/522 |
| 5,063,603 | 11/1991 | Burt .......................................... 382/37 |
| 5,067,014 | 11/1991 | Bergen et al. ........................... 358/105 |
| 5,133,070 | 7/1992 | Barker et al. ........................... 395/650 |
| 5,134,473 | 7/1992 | Nagura .................................... 358/109 |
| 5,140,416 | 8/1992 | Tinkler ...................................... 358/88 |
| 5,210,799 | 5/1993 | Rao .......................................... 382/22 |
| 5,212,544 | 5/1993 | Kellar et al. ............................... 358/22 |
| 5,259,040 | 11/1993 | Hanna ....................................... 382/41 |
| 5,260,791 | 11/1993 | Lubin ...................................... 358/160 |
| 5,270,756 | 12/1993 | Busenburg .............................. 358/109 |
| 5,296,926 | 3/1994 | Nagura .................................... 348/144 |
| 5,307,456 | 4/1994 | Mackay ................................... 395/154 |
| 5,325,449 | 6/1994 | Burt et al. ................................. 382/56 |
| 5,355,450 | 10/1994 | Garmon et al. ......................... 395/162 |
| 5,414,806 | 5/1995 | Richards ................................. 395/135 |
| 5,455,775 | 10/1995 | Huber et al. ............................ 364/488 |
| 5,473,364 | 12/1995 | Burt .......................................... 348/47 |
| 5,479,597 | 12/1995 | Fellous ................................... 395/154 |
| 5,488,674 | 1/1996 | Burt et al. ............................... 382/284 |
| 5,511,153 | 4/1996 | Azarbayejani et al. ................. 395/119 |
| 5,577,190 | 11/1996 | Peters ..................................... 395/501 |
| 5,588,104 | 12/1996 | Lanier et al. ........................... 395/326 |
| 5,588,139 | 12/1996 | Lanier et al. ........................... 395/500 |
| 5,596,687 | 1/1997 | Peters, Jr. ................................ 395/130 |
| 5,619,628 | 4/1997 | Fujita et al. ............................ 395/127 |
| 5,696,892 | 12/1997 | Redmann et al. ...................... 395/125 |
| 5,748,199 | 5/1998 | Palm ....................................... 345/473 |
| 5,790,124 | 8/1998 | Fischer et al. .......................... 345/435 |
| 5,841,439 | 11/1998 | Pose et al. .............................. 345/418 |
| 5,850,352 | 12/1998 | Moezzi et al. ...................... 364/514 A |
| 5,864,342 | 1/1999 | Kajiya et al. ........................... 345/418 |

OTHER PUBLICATIONS

Hayashi, M., "Image Compositing Based on Virtual Cameras," *IEEE MultiMedia*, pp. 36–48, (Jan.–Mar. 1998).

Mallem, M., et al., "Creation and animation of computer–generated images combined with a camera and smart graphics card," *Butterworth–Heinemann Ltd*, 15(No. 8):427–433, (Oct. 1991).

Poelman, C.J., "The Paraperspective and Projective Factorization Methods for Recovering Shape and Motion," *Carnegie Mellon School of Computer Science*, (Jul. 1995).

Becker, S., et al., "Semiautomatic 3–D Model Extraction From Uncalibrated 2–D Camera Views," *MIT Media Laboratory*.

Sawhney, H.S., "3D Geometry From Planar Parallax," *Machine Vision Group—IBM Almaden Research Center*, (1994).

Ballard, D.H., et al., "An Approach to Knowledge–Directed Image Analysis," *Computer Vision Systems*, (1978).

Burt, P.J. et al., "The Laplacian Pyramid as a Compact Image Code," *IEEE Transactions on Communications*, COM–31(4):532–540, (Apr. 1983).

Williams, T.W. et al., "Model–Building in the Visions System," Massachusetts Institute of Technology $5^{th}$ International Joint Conference on Artificial Intelligence, 2:644–645, (Aug. 1977).

Jancene, P. et al., "RES: Computing the Interactions Between Real and Virtual Objects in Video Sequences.".

Rohrer, R., "Automated Construction of Virtual Worlds Using Modeling Constraints," *The George Washington University—Progress Report*, (Jan. 1994).

Debevec, P.E., et al. "Modeling and Rendering Architecture from Photographs: A Hybrid Geometry–and Image–Based Approach," Computer Graphics Proceedings, Annual Conference Series, 11–20,(1996).

Debevec, P.E., et al. "Recovering High Dynamic Range Radiance Maps from Photographs," Computer Graphics Proceedings, Annual Conference Series, 369–378,(1997).

Alzarbayejani, A., et al. "Recursive Estimation of Motion, Structure, and Focal Length," *IEEE Transactions on Pattern Analysis and Machine Intelligence*, 17(6):562–575, (Jun. 1995).

Berthold, K.P.H., et al. "Determining Optical Flow," *Artificial Intelligence*, 17:185–203, (1981).

Brooks, R.A., et al. "Geometric Modeling in Vision for Manufacturing," *SPIE*, 281:141–159, (1981).

Fua, P., "Model–Based Optimization: An Approach to Fast, Accurate, and Consistent Site Modeling from Imagery," *Artificial Intelligence Center—SRI International*.

Fua, P., et al., "Using 3–Dimensional Meshes to Combine Image–Based and Geometry–Based Constraints," *SRI International*.

Tomasi, C., et al., "Shape and Motion from Image Streams: a Factorization Method—Planar Motion," *Carnegie Mellon School of Computer Science*, (Sep. 1990).

Tomasi, C., et al., "Shape and Motion from Image Streams: a Factorization Method—Point Features in 3D Motion," *Carnegie Mellon School of Computer Science*, (Jan. 1991).

Tomasi, C., "Shape and Motion from Image Streams: a Factorization Method," *Carnegie Mellon School of Computer Science*, (Sep. 1991).

Little, T.D.C., et al., "Interval–Based Conceptual Models for Time–Dependent Multimedia Data," *Boston University Multimedia Communications Laboratory and Purdue University School of Electrical Engineering Multimedia Communications Lab*, (May 1993).

Schechter, G., et al., "Functional 3D Graphics in C++—with an Object–Oriented, Multiple Dispatching Implementation," *Eurographics Object–Oriented Graphics Workshop*, (1994).

Elliott, C., "The Essence of ActiveX Animation," *Microsoft Research*, (Feb. 1997).

Elliott, C., "A Brief Introduction to Active VRML," *Microsoft Research Technical Report*, (Feb. 1996).

Maestri, G., "Parametric, Object–Oriented Modeling and Animation with Houdini," pp. 48–50, *Digital Magic*, (Aug. 1997).

Drazovich, R.J., et al., "Radar Target Classification," pp. 496–501, *IEEE*, (Aug. 1981).

Levine, M.D. et al., "A Knowledge–Based Computer Vision System," pp. 335–352, *Computer Vision Systems*, (1978).

State, A. et al., "Superior Augmented Reality Registration by Integrating Landmark and Magnetic Tracking," pp. 429–438, Computer Graphics Proceedings, Annual Conference Series, (1996).
"Middlesex Virtual Set System," *Product Brochure*, (1997).
"Cyberset O Highland Virtual Set," *Product Orad High–Tec Systems*, (1997).
"Virtual Replay Sports Analysis Tool," *Product Brochure*, (1997).
"Jaleo Digital Post Production System," *Product Brochure*, (1997).
"Flint and Flint RT," *Product Brochure*, (Mar. 1997).
"Warner Digital Creates Glacial Gales," *American Cinematographer*, pp. 38–39, (Jul. 1997).
"Digiscore Saves the Day," *Product Flyer*, (1996).
"Inferno," *http://www.discreet.com*, (1997).
"Flame," *Product Description, http://www.discreet.com*, (1997).
"Composer V4," *Alias Wave Front Product Description*, (1995).
"Power Animator," *Alias/Wavefront Product Brochure*, (1996).
"SoftImage 3D 3.51 for Windows," *Product Review*, (1995).
"3D Studio Max," *Product Review*, (1997).
"Animation Master," *Product Demonstration*, (1997).
Clarkson, M.,"3D Animation Tools for Less Than $1,500," *PC Graphics and Video*, pp. 52–56, (Aug. 1996).
Hamlin, J.S., "Autodessys' 3D Modeler FormZ Renderzone 2.8," *PC Graphics and Video*, pp. 58–62, (Aug. 1996).
Street, R., "3–D Software for the Newcomer," *A V Video*, pp. 62–67, (Jul. 1996).
Sowizral, H., et al., "JAVA 3D API Specification," (Aug. 1997).
Tenenbaum, J.M., et al., "IGS: A Paradigm for Integrating Image Segmentation and Interpretation," *Artificial Intelligence Center—Stanford Research Institute*, pp. 504–513.

Binford, T.O., et al., "Image Understanding Via Geometric Models," pp. 364–369, *IEEE*, (1980).
Price, K.E., et al., "Symbolic Matching of Images and Scene Models," pp. 105–112, *IEEE*, (1982).
Amini, A.A., et al., "Representation and Organization of Domain Knowledge in a Blackboard Architecture: A Case Study from Computer Vision," pp. 884–889, *IEEE*, (1987).
Feldman, J.A., et al., "Decision Theory and Artificial Intelligence—A Semantics–Based Region Analyzer," *Artificial Intelligence*, 5:349–371, (1974).
Barrow, H.G., et al., "Representation and Use of Knowledge in Vision," *Stanford Research Institute*.
Nevatia, R., et al., "Description and Recognition of Curved Objects," *Artificial Intelligence*, 8:77–98, (1977).
Parma, C.C., et al., "Experiments in Schema–Driven Interpretation of a Natural Scene," pp. 237–245, *IEEE* (1980).
Hanson, A.R., et al., "Constructing Semantic Models in the Visual Analysis of Scenes," The Milwaukee Symposium on Automatic Computation and Control, pp. 97–102.
Shaheen, S.I., et al., "Some Experiments with the Interpretation Strategy of a Modular Computer Vision System," *Pattern Recognition*, 14(1–6): 87–100, (1981).
Levine, M.D., et al., "A Modular Computer Vision System for Picture Segmentation and Interpretation," *IEEE Transactions on Pattern Analysis and Machine Intelligence, PAMI–3*(5):540–556, (Sep. 1981).
Levine, M.D., et al., "A Modular Computer Vision System for Picture Segmentation and Interpretation," pp. 522–539, *IEEE*, (1979).
"Nonlinear Video Reigns at NAB," *NewMedia*, pp. 21–29, (Jun. 1996).
Beale, S., "Media Components Come Together," *www.macworld.com*, pp. 56–57, (Nov. 1996).

SCENE MODEL                    40

SPATIAL REFERENCE              41
    VISUAL COORDINATE SYSTEM    41-1
    ABSTRACT COORDINATE SYSTEM    41-2

OBJECT LIST                    43
    IMAGE-BASED OBJECT 1    50-1
    IMAGE-BASED OBJECT 2    50-2
    IMAGE-BASED OBJECT h    50-h
        IMAGE-BASED OBJECT h-1    (REGION 1)
        ⋮
        IMAGE-BASED OBJECT h-j    (REGION j)
        ⋮
    IMAGE-BASED OBJECT i    50-i

} 50

ABSTRACTION-BASED OBJECT 1    60-1
    ABSTRACTION-BASED OBJECT 2    60-2
    ABSTRACTION-BASED OBJECT h    (PERSON) 60-h
        ABSTRACTION-BASED OBJECT h-1 (ARMS)
        ABSTRACTION-BASED OBJECT h-2 (HEAD)
        ABSTRACTION-BASED OBJECT h-3 (LEGS)
        ABSTRACTION-BASED OBJECT h-4 (TORSO)

} 60

ABSTRACTION-BASED OBJECT    60-j

LIGHT OBJECT    · · · 74
    CAMERA OBJECT    · · · 75
    VIEWING OBJECT    · · · 76
    PATH OBJECT    · · · 77
    OPERATION OBJECT    · · · 78
    PROXY OBJECT    · · · 79

} 70

CORRELATION MESH
    IMAGE-BASED OBJECT u: ABSTRACTION-BASED OBJECT v 80-1
    IMAGE-BASED OBJECT w: ABSTRACTION-BASED OBJECT x 80-2
    ⋮
    IMAGE-BASED OBJECT y: ABSTRACTION-BASED OBJECT z 80-c

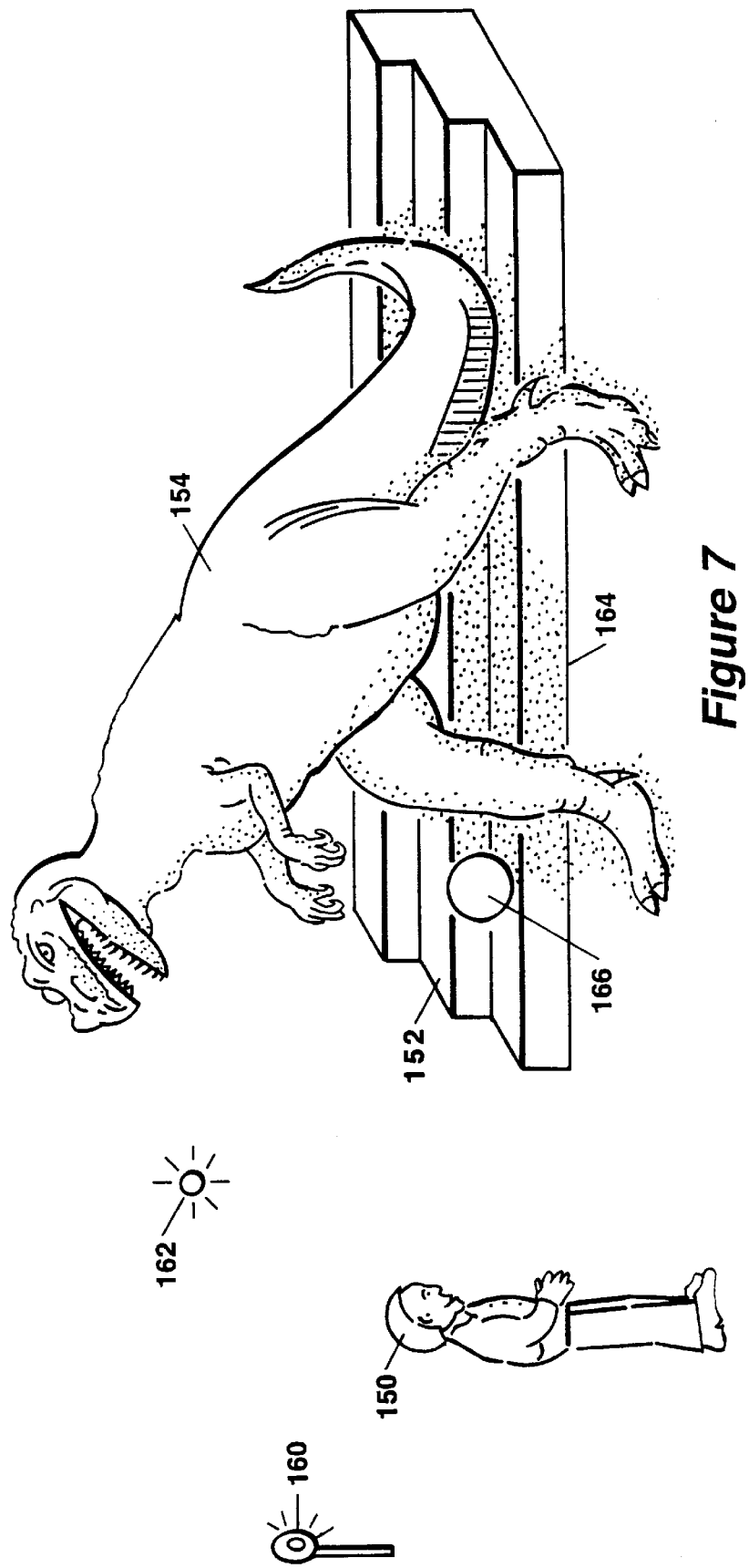

ITERATIVE THREE-DIMENSIONAL PROCESS FOR CREATING FINISHED MEDIA CONTENT

CROSS REFERENCE TO RELATED APPLICATION

This application claims the benefit of a co-pending U.S. Provisional Application Ser. No. 60/043,075 filed Apr. 7, 1997.

BACKGROUND OF THE INVENTION

Media productions such as motion pictures, television shows, television commercials, videos, multimedia CD-ROMs, web productions for the Internet/intranet, and the like have been traditionally created through a three-phase process: pre-production, production and post-production. Pre-production is the concept generation and planning phase. In this phase, scripts and storyboards are developed, leading to detailed budgets and plans for and post-production. Production is the phase for creating and capturing the actual media elements used in the finished piece. Post-production combines and assembles these individual elements, which may have been produced out of sequence and through various methods, into a coherent finished result using operations such as editing, compositing and mixing.

During the production phase, two distinct categories of production techniques can be used, live/recorded production and synthetic production.

The first category, "live/recorded media production," is based on capturing images and/or sounds from the physical environment. The most commonly used techniques capture media elements in recorded media formats such as film, videotape, and audiotape, or in the form of live media such as a broadcast video feed. These media elements are captured through devices like cameras and microphones from the physical world of actual human actors, physical models and sets. This requires carefully establishing and adjusting the lighting and acoustics on the set, getting the best performance from the actors, and applying a detailed knowledge of how the images and sounds are captured, processed and reconstructed.

As live/recorded media elements are captured, they are converted into sampled representations, suitable for reconstruction into the corresponding images and sounds. Still images are spatially sampled: each sample corresponds to a 2D region of space in the visual image as projected onto the imaging plane of the camera or other image capture device. Note that this spatial sampling is done over a specific period of time, the exposure interval. Audio is time-sampled: each sample corresponds to the level of sound "heard" at a specific instance in time by the microphone or audio capture device. Moving images are sampled in both space and time: creating a time-sampled sequence of spatially-sampled images, or frames.

Sampled media elements can be represented as analog electronic waveforms (e.g. conventional audio or video signals), digital electronic samples (e.g. digitized audio or video), or as a photochemical emulsion (e.g. photographic film). The sampled live/recorded media elements are reconstructed as images or sounds by reversing the sampling process.

The second category of production techniques, synthetic media production, uses computers and related electronic devices to synthetically model, generate and manipulate images and sounds, typically under the guidance and control of a human operator. Examples of synthetic media production include computer graphics, computer animation, and synthesized music and sounds. Synthetic media uses synthetic models to construct a representation inside a computer or other electronic system, that does not exist in the natural physical world, for output into a format that can be seen or heard. Synthetic images are also called computer-generated imagery (CGI).

Synthetic media models are mathematical, geometric, or similar conceptual structures for generating images and/or sounds. They can be represented in software, hardware (analog circuits or digital logic), or a combination of software and hardware. These models specify, explicitly or implicitly, sequences of electronic operations, digital logic, or programmed instructions for generating the media elements, along with their associated data structures and parameters.

Synthetic media models are converted into actual images or sounds through a synthesis or "rendering" process. This process interprets the underlying models and generates the images and/or sounds from the models. Unlike sampled media elements, a synthetic media element can generate a wide range of different but related images or sounds from the same model. For example, a geometric model can generate visual images from different viewpoints, with different lighting, in different sizes, at different resolutions (level of detail). A synthetic musical composition can generate music at different pitches, at different tempos, with different "instruments" playing the notes. In contrast, live/recorded media elements can only reconstruct images or sounds derived from the samples of the original captured image or sound, though perhaps manipulated as, for example, for optical effects.

Creating synthetic models can be very labor-intensive, requiring considerable attention to detail and a thorough understanding of the synthetic modeling and rendering process. Synthetic models can be hierarchical, with multiple constituent elements. For example, a synthetic model of a person might include sub-models of the head, torso, arms and legs. The geometric, physical, acoustical and other properties, relationships and interactions between these elements must be carefully specified in the model. For animated synthetic media elements, the models typically include "motion paths": specifications of the model's movement (in 2D or 3D) over time. Motion paths can be specified and applied to the entire model, or to different constituent parts of hierarchical models.

To increase the perceived realism of a rendered synthetic element, the structure of a synthetic model may incorporate or reference one or more sampled media elements. For example, a synthetic geometric model may use sampled image media elements as "texture maps" for generating surface textures of the visual image (e.g. applying a sampled wood texture to the surfaces of a synthetic table). In a similar manner, sampled sound elements can be used to generate the sounds of individual notes when rendering a synthetic model of a musical composition. Within synthetic media production, there is an entire sub-discipline focused on capturing, creating and manipulating these sampled sub-elements to achieve the desired results during rendering. (Note that these sampled sub-elements may themselves be renderings of other synthetic models.)

Synthetic media is based on abstract, hierarchical models of images and sounds, while live/recorded media is based on sampled representations of captured images and sounds.

Abstract hierarchical models allow synthetic media elements to incorporate sub-elements taken from live/recorded media. However, the reverse is not possible. The sampled representation of a live/recorded media cannot include a synthetic model as a sub-element. This is the key difference between reconstructing a live/recorded media element from its samples, and rendering a synthetic media element from its model.

While synthetic media elements are arguably more versatile than live/recorded media elements, they are limited in modeling and rendering truly "realistic" images and sounds. This is due to the abstract nature of the underlying synthetic models, which cannot fully describe the details and complexities of the natural world. These limitations are both theoretical (some natural phenomena cannot be described abstractly) and practical. The time, effort and cost to model and render a highly realistic synthetic media element can vastly outweigh the time, effort and cost of capturing the equivalent real image or sound.

Because a sampled media element has a very simplified structure (a sequence of samples) and contains no abstract hierarchical models, the process of capturing and then reconstructing a sampled media element is typically very efficient (usually real-time) and relatively inexpensive.

In comparison, the process of modeling and then rendering a synthetic media element can be very time-consuming and expensive. It may take many minutes or hours to render a single synthetic visual image using modern computer-based rendering systems.

Indeed, high quality post-production of such elements first requires sophisticated processing of the synthetic models at a high degree of resolution. Rendering techniques such as ray tracing and radiosity must consider each possible source of illumination for each pixel for each synthetic object, including ambient, diffuse, and specular color sources, while at the same time performing necessary 3D to 2D transformations. The 2D renderings from multiple synthetic models then require compositing, overlaying, and other operations to achieve the desired end result.

In summary, the processes and techniques used in synthetic media production are very different from those used in live/recorded media production. Each produces media elements that are difficult, costly or even impossible to duplicate using the other technique. Synthetic media production is not limited or constrained by the natural physical world. But synthetic techniques are themselves limited in their ability to duplicate the natural richness and subtle nuances captured in live/recorded media production.

Therefore it has become highly advantageous to combine both types of production techniques in a media production. Each technique can be used where it is most practical or cost effective, and combinations of techniques offer new options for communication and creative expression.

Increasingly, producers and directors of media productions are creating scenes where multiple elements (synthetic and/or live/recorded elements) appear to be interacting with each other, co-existing within the same real or imagined space. They also want to apply synthetic techniques to manipulate and control the integration of separately produced live/recorded media elements. These new techniques can create attention-grabbing special effects: synthetic dinosaurs appearing to interact with human actors, synthetic spaceships attacking and destroying familiar cities, the meow of a cat replaced by the simulated roar of a dozen lions. There is also growing demand for more subtle, barely noticeable, alterations of reality: an overcast day turned into bright sunlight, scenery elements added or removed, or seamless replacements of objects (e.g. a can of soda held by an actor replaced with a different brand).

These "hybrid" media productions require combining separately produced media elements as if they were produced simultaneously, within a single common physical or synthetic space. This includes the need for bridging between production techniques that are done separately and independently, perhaps with entirely different tools and techniques. The requirements of hybrid productions place new requirements on all three phases of the production process (pre-production, production and post-production) that are time-consuming, labor-intensive and costly. In pre-production 11, careful planning is required to ensure that all media elements will indeed look as if they belong in the same scene. During production, media elements must be created that appear to co-exist and interact as if they were captured or created at the same time, in the same space, from the same viewpoint. In post-production, the elements need to be combined (or "composited") to generate believable results: by adjusting colors, adding shadows, altering relative sizes and perspectives, and fixing all of the inevitable errors introduced during independent and often very separate production steps.

In some hybrid productions, the same object is represented as both a live/recorded and a synthetic media element. This allows the different representations to be freely substituted within a scene. For example, a spaceship might be captured as a live/recorded media element from an actual physical model and also rendered from a synthetic model. In shots where complex maneuvering is required, the synthetic version might be used, while the captured physical model might be used for detailed close-ups. The transitions between the physical and synthetic versions should not be noticeable, requiring careful matching of the geometry, textures, lighting and motion paths between both versions which have been produced through entirely separate processes.

These new requirements for hybrid productions require a new approach to the tools and processes used in media production. Today, the task of combining different media elements is commonly done through editing, layered compositing and audio mixing. All are typically part of the post-production process (or the equivalent final stages of a live production).

In today's post-production process, each visual media element is treated as a sequence of two-dimensional images much like a filmstrip. Each audio element is treated as much like an individual sound track in a multi-track tape recorder. Live/recorded media elements can be used directly in post-production, while synthetic media elements must first be rendered into a format compatible with the live/recorded media elements.

Editing is the process of sequencing the images and sounds, alternating as needed between multiple live/recorded media elements and/or rendered synthetic elements. For example, an edited sequence about comets might start with an recorded interview with an astronomer, followed by a rendered animation of a synthetic comet, followed by recorded images of an actual comet. In editing, separate media elements are interposed, but not actually combined into a single image.

Layered compositing combines multiple visual elements into a single composite montage of images. The individual images of a visual media element or portions thereof are "stacked up" in a series of layers and then "bonded" into a single image sequence. Some common examples of layered compositing include placing synthetic titles over live/recorded action, or placing synthetic backgrounds behind live actors, the familiar blue-screen or "weatherman" effects. More complex effects are built up as a series of layers, and individual layers can be manipulated before being added to the composite image.

Audio mixing is similar to layered compositing, mixing together multiple audio elements into a single sound track which itself becomes an audio element in the final production.

Today's editing, mixing and layered compositing all assume a high degree of separation between live/recorded and synthetic production processes, waiting until post-production to combine the synthetic elements with the live/recorded elements. Since editing is inherently a sequencing operation, there are few problems introduced by the separation during production of live/recorded and synthetic elements.

However, the techniques used in layered compositing place severe restrictions on how different visual elements can be combined to achieve realistic and believable results. Building up an image sequence from multiple layers introduces a "layered look" into the finished material. It becomes very difficult to make the various media elements appear to "fit in" within composited images, as if they all co-existed in the same physical space. Differences in lighting and textures can be very apparent in the composited result.

Making the media elements appear to actually interact with each other adds additional levels of complexity. In a layered technique, the different media elements are necessarily in distinct layers, requiring considerable manual intervention to make them appear to realistically interact across their respective layers. If objects in different layers are moving in depth, layers must be shuffled and adjusted from frame to frame as one object moves "behind" the other, and different parts of each object must be adjusted to appear partially occluded or revealed. When this technique produces unacceptable results, the operator must attempt further iterations, or resort to manually adjusting individual pixels within individual frames, a process called "painting," or accept a lower quality result.

Substituting between different versions of the same object, which may include both live/recorded version(s) and rendered synthetic version(s), is equally difficult. This type of substitution should appear to be seamless, requiring careful and detailed matching between the "same" elements being mixed (or dissolved) across separate compositing layers. The human eye and ear are very sensitive to any abrupt changes in geometry, position, textures, lighting, or acoustic properties. Making the substitution look right can require multiple trial-and-error iterations of synthetic rendering and/or layered compositing.

These problems result from the traditional separation between live/recorded production and synthetic production, along with the traditional separation of both types of production from the post-production process. Today, both types of production generate a sequence of flattened two-dimensional images taken from a specific viewpoint.

Only the final sequences of 2D images are taken into the post-production process.

Even though the physical set of a live/recorded production is inherently three-dimensional, the captured result is a 2D image from the camera's perspective.

Similarly, many synthetic media tools are based on computer-generated 3D geometry but the resultant images are rendered into sequences of 2D images from the perspective of a "virtual camera". Any information about the relative depths and physical (or geometric) structure of objects has been lost in the respective imaging processes. There is little or no information about the relative position and motion of objects, of their relationships to the imaging viewpoint, or of the lighting used to illuminate these objects.

Then, in post-production, these 2D image sequences must be artificially constructed into simulated physical interactions, believable juxtapositions, and three-dimensional relative motions. Since the different visual elements were created at different times, often through separate and distinct processes, and exist only as sequences of 2D flattened images, this is extremely challenging.

Overcoming these problems using layered compositing is labor-intensive, time consuming and expensive. The images to be manipulated must be individually captured or created as separate layers, or separated into layers after production using techniques such as matting, image tracking, rotoscoping and cut-and-paste. Complex effects require dozens or even hundreds of separate layers to be created, managed, individually manipulated and combined.

Information about depths, structures, motions, lighting and imaging viewpoints must be tracked manually and then manually reconstructed during the compositing process.

Interactions between objects must be done individually on each object within its own layer, with three-dimensional motions and interactions adjusted by hand. Manual labor is also required to simulate the proper casting of shadows, reflections and refractions between objects. These are also typically created by hand on every affected layer on every individual frame.

Consider a scene where a recorded actor grabs a synthetic soda can and throws it into a trash barrel. In each frame, the position of every finger of the hand needs to be checked and adjusted so that it appears to wrap around the soda can. The synthetic soda can has to show through the space between the fingers (but not "bleed through" anywhere else), and move as if it were being picked up and tossed out. As the can travels to the trash barrel, it must properly occlude various objects in the scene, cast appropriate shadows in the scene, land in the barrel, and make all the appropriate sounds.

The common solution to many of these problems is to separate each of the affected images into its own image layer, and then individually paint and/or adjust each of the affected images within each and every one of the affected layers. This involves manual work on each of the affected layers of the composited image, often at the level of individual pixels. In a feature film, each frame can have up to 4,000 by 3,000 individual pixels at a typical frame rate of 24 frames per second. In a TV production, at about 30 frames per second, each frame can have approximately 720 by 480 individual pixels. The required manual effort, and artistic skill, can result in man-months of work and tens of thousands of dollars expended in post-production.

Similar problems exist in audio mixing. The human ear is very sensitive to the apparent "placement" of sounds so that they correspond with the visual action. In a visual image produced with layered compositing, the movement of objects in the composited scene needs to be reflected in the audio mix. If an object goes from left to right, forward to back, or goes "behind" another object, the audio mix needs to reflect these actions and resulting acoustics. Today, all of this is done primarily through manual adjustments based on the audio engineer viewing the results of layered compositing. If the layered composite is altered, the audio must be re-mixed manually.

What is needed is a way to accelerate and simplify the post-production process for media productions, especially for media productions where multiple media elements must appear to interact as if they existed within a common space.

SUMMARY OF THE INVENTION

The present invention is an integrated production process that combines multiple live/recorded and/or synthetic media elements in a unified three-dimensional (3D) virtual stage environment for media production, and therefore permits iterative analysis and/or choreography of constituent media elements to support simulated finishing interactions among and between the elements.

More particularly, an initial analysis step in the process first derives both image-based and abstraction-based data objects as detected from a live/recorded image stream. This is done using various combinations of image processing and abstract modeling algorithms, including "machine vision" or "image understanding" techniques where applicable. For example, the analysis step may consist of using image processing algorithms to derive image-based data objects that represent actual physical items on a set in the real world. This analysis step may also derive, from the same live/recorded image stream, a set of geometric, volumetric, mathematical, or other abstraction-based object representations of the actual physical items.

In the analysis step, a scene model may also be developed that contains data pertaining to the position, shape, size, relative depth, motion, and other relevant attributes of individual components corresponding to actors, cameras, props, background scenery and other elements of the scene. This scene model data is then placed in an object-oriented database and can form the basis for defining the 3D virtual stage.

Similarly, the analysis step can be applied to a synthetic scene rendered from the output of a computer animation or similar system. Synthetic media elements can also be imported directly from a computer animation or similar system without requiring the intermediate rendering and analysis steps. Analysis can also be performed on streams of audio samples, using various combinations of signal processing algorithms.

The various media elements, live/recorded and/or synthetic, can be choreographed together within the context of the unified 3D virtual stage. This includes representations of visual objects, audio objects, cameras, lights, microphones, and other objects required to create the desired media content. New objects can be directly created, captured, and/or imported from external systems as needed during choreography. The choreography step permits adjustment of the spatial and temporal relationships between the media elements, and defining any operations and interactions required to achieve the desired visual effects.

From these are rendered finished images and sounds.

In this finishing step, a finished image stream representation is generated from the virtual stage. The finished image stream is created by first rendering the live/recorded media elements and/or synthetic elements from the unified 3D virtual stage to 2D image-based projections, inserting and/or substituting image-based objects that correspond with objects in the virtual stage and then blending the image-based regions, such as by comparing depth and transparency information on a pixel-by-pixel basis. Audio elements may be modified according to the dynamics and acoustics of the virtual stage, synchronized with the visual elements, and mixed into one or more output audio tracks. The output of the finishing step is typically formatted as a set of media elements rendered into an appropriate sampled format (such as rendered 2D visual images and mixed audio tracks).

The user then reviews the results of the finishing step to determine if the finished image stream representation is of acceptable quality. If so, the media production process is complete.

If, however, the resulting finished image stream is not acceptable, the user specifies different settings for the analysis step and/or different parameters for the media elements.

The analysis, choreography and finishing steps are then recursively iterated in whatever sequence specified by the user until the desired quality finishing results are obtained. Note that the finishing step can be requested at any time by the user, and the intermediate results may reflect only partial or incomplete versions of the final media content. This allows the user to preview finished results in order to guide subsequent iterations of analysis and/or choreography steps.

The invention is also an iterative process for developing an output image stream with audio that begins by defining a three dimensional (3D) virtual stage, capturing at least one input image stream from one or more physical objects, and then generating one or more pixel representations (pixels or pixel regions) segmented from the input image streams that partially or completely represent at least one of the physical objects. The process continues by developing one or more partial or complete abstract models of at least one of the physical objects, and then correlating at least one of the pixel representations with at least one of the corresponding abstract models of the same physical object. A choreography specification may also be defined to specify time-sequenced manipulations of the abstract models in the virtual stage.

An output image stream is then generated as a time-based sequence of 2D images and optional audio tracks using the virtual stage definition from the viewpoint of a specified virtual camera, as well as some combination of the choreography specification, the abstract models, and the pixel representations.

In addition, the process permits a human operator to iteratively and successively specify and control which of the pixel representations and which of the corresponding abstract models are used in the generation of the specific output image streams.

The process may operate with multiple abstract models and/or multiple pixel representations of a given physical or synthetic object.

An abstract model of the position of a camera used to generated the output image stream, including any movement or change in orientation over time of that camera, may also be generated as part of the process. Similarly, an abstract model of the lighting used to illuminate the physical or synthetic scene, and any dynamics over time, may also be created, as well as data object representing audio tracks synchronized and mixed with the output image streams.

The choreography specification may also include the specification of inter-object effects (such as shadows, reflections, and/or refractions), atmospheric, spatial, object geometry, volumetric and/or other image-distorting effects, including inter-object morphing and static or dynamic changes to object surface textures and/or other object surface attributes such as reflectivity and/or opacity.

The human operator may optionally and successively specify and control the parameters for one or more external 3D rendering systems used in generating the output image streams.

Additional steps may generate information needed for determining each output image stream for use in image blending operations, such as 3D distances from the virtual camera, transparency information, and/or surface normal vectors, generated for any or all image frames on either a per pixel, per pixel region, or sub-pixel basis.

The process may also include steps for accepting inputs from a human operator to iteratively and successively specify and control how this additional information will be used to blend multiple 2D output image streams into a single composite output image stream (with associated audio tracks, if any).

The process also may include steps whereby a human operator can iteratively and successively specify and control changes to the choreography specification, based upon intermediate results from the generation of and/or blending of the output image streams.

In addition, the process may permit a human operator to iteratively and successively specify and control changes to an object correlation database or to the segmentation of image streams into one or more pixel representations, based upon intermediate results from the generation and/or blending of output image streams.

Further process steps can be used to allow a human operator to iteratively and successively specify and control changes to the operation and/or parameters of algorithms that automate the process.

Other process steps may optionally permit the creation and maintenance of multiple versions of image streams and/or pixel representations (e.g. different levels of image resolution, different levels of image detail, different color space representations), allowing automatic and/or user-controlled determination of which version to use in generating the output image stream.

The process may also include steps that allow the user to create and maintain multiple versions of abstract models (e.g., at different levels of geometry detail and/or different representations of surface textures), allowing automatic and/or user-controlled determination of which abstract object version to use for in generating the output image streams.

These latter two steps permit automatic and/or user-controlled synchronization of applying a given set of operations and/or manipulations to one or more corresponding versions of the same source object either simultaneously or delayed in time.

The invention may also include a step of generating and/or blending of output image stream representations by providing an application programming interface that provides access to some or all aspects of the choreography specification, correlation database, abstract models, pixel representations and/or image streams.

It is therefore possible to continuously and iteratively improve the final result of a media production process, both prior to and during post-production, by reviewing and revising intermediate results. This is in contrast to a segmented, linear, non-integrated approach of separate production processes, followed by rendering, layered 2D compositing, 2D painting and audio mixing, as has been done in the prior art. Combining and manipulating elements within a unified 3D production environment prior to the "flattening" of visual media elements into 2D sampled representations avoids the labor-intensive and error-prone process of creating simulated 3D movements and object interactions through traditional 2D layered compositing, painting, and audio mixing techniques.

The benefits of this integrated approach for successive production refinement can be considerable. These include reduced cost, increased flexibility, greater communication across team members, higher quality results, a nd all owing greater risk-taking in creative expression.

BRIEF DESCRIPTION OF THE DRAWINGS

The above and further features of the invention include various novel details of construction and combination of components. These novel features will be more particularly pointed out in the following claims, and their advantages will also become evident as they are described in detail with reference to the accompanying drawings, in which:

FIG. 4 is an illustration of an exemplary scene model object;

FIG. 7 is an illustration of how the finishing process can simplify post-production.

DETAILED DESCRIPTION OF PREFERRED EMBODIMENTS

Figure 1:
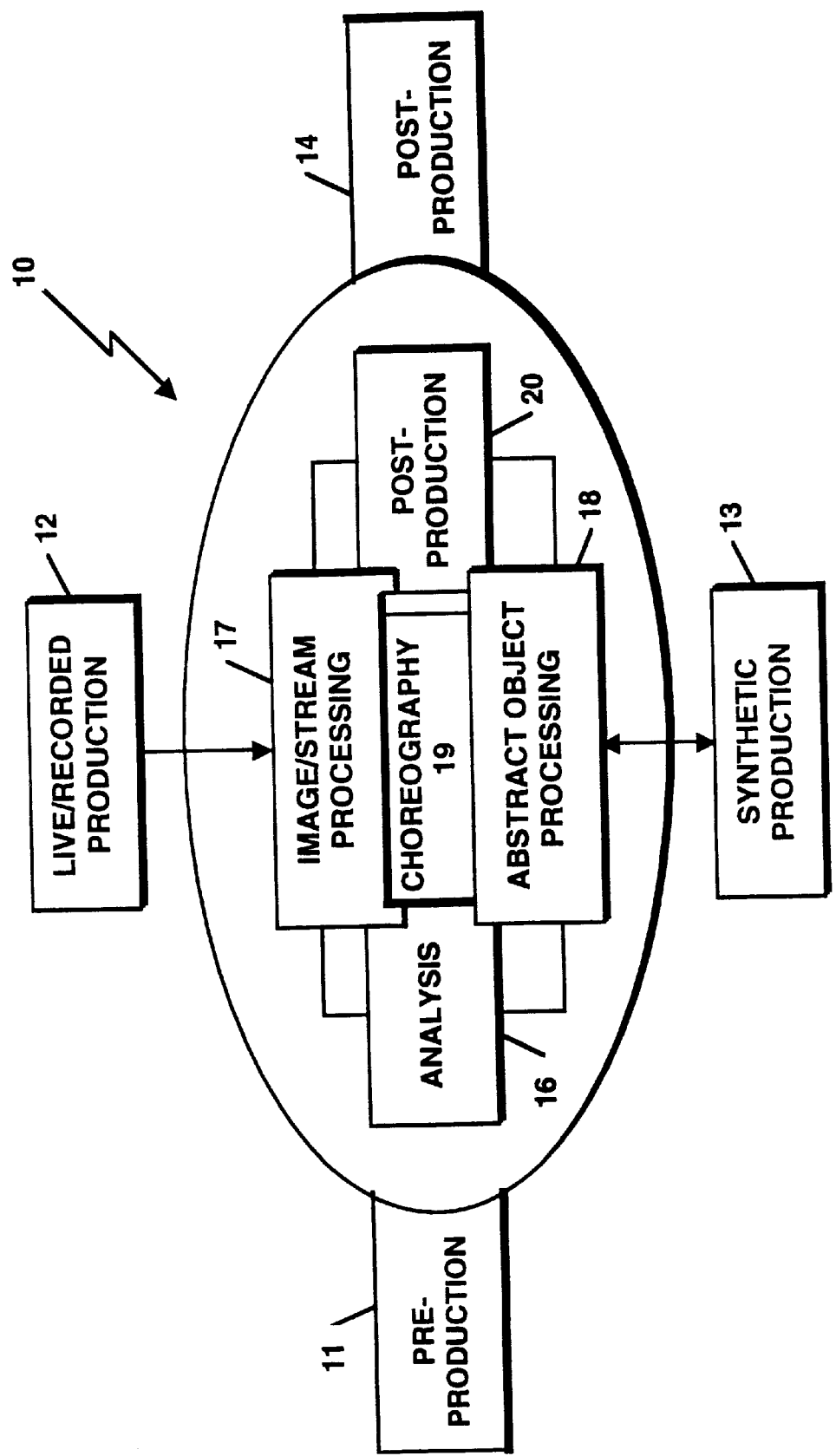
FIG. 1 is a generalized flow diagram of a process for iterative finish rendering from an integrated scene model consisting of segments from live/recorded media elements and synthetic elements according to the invention.

Turning attention now to the drawings, FIG. 1 is a generalized flow diagram of a process for media production according to the invention. As in the prior art, a media production system 10 consists of a pre-production process 11, a live/recorded media production phase 12, a synthetics production phase 13, and a post-production phase 14.

The pre-production phase 11 largely involves visualizing what is to be done in terms of story boards, scripts, set designs, actors, props, animation, graphics and other elements to accomplish the desired production. The pre-production phase 11 results in descriptions of items to be produced as live/recorded media elements (such as film clips, video clips, audio clips and the like) to the live/recorded media production phase 12. Descriptions of graphics, animations, synthesized music or other media elements derived from computer models are provided to synthetic media production 13.

The live/recorded media production phase 12 captures media elements of various types. The media elements may include recorded media formats such as film, video tape, or audio tape or may include live media formats such as broadcast video feeds. Visual media elements are provided as image stills (two-dimensional sampled images) or image streams (a sequential series of two-dimensional sampled images), while sound elements are provided as audio streams (a sequential series of audio samples) to a post-production process 14 as is well known in the prior art.

The synthetic media production phase 13 receives descriptions of graphics, animations, synthesized music, computer models and other synthetic objects from the pre-production phase 11. During synthetic media production 13, automated systems such as three-dimensional computer graphics and animation systems are used to further design, sketch, and refine models of the synthetic visual objects using a computer in terms of abstract geometric, mathematical and structural relationships. Attributes may be assigned to the objects such as textures or motion paths. Similarly, automated systems for producing synthetic audio elements can be used to specify and refine music and sounds in terms of musical notation and abstract models of sonic reproduction. Synthetic media production 13 renders such synthetic elements and objects into the appropriate sampled formats, providing these to the post-production phase 14.

Typically, the only direct connection between the two types of production in FIG. 1 is by providing one or more captured images or sounds from live/recorded production to synthetic production. The captured images can be used as either 2D background plates or sources for sampled textures in synthetic visual production. Captured sounds can be used as sources of sound samples in synthetic audio production. When synthetic elements will be combined with live/recorded elements in post-production 14, the majority of synthetic media production 13 is often done after live/recorded media production 12 has been completed. In these cases, synthetic media production 13 will often overlap in time with post-production 14 where the elements are actually combined.

The post-production phase 14 takes captured live/recorded media elements (from 12) and rendered synthetic media elements (from 13) and applies operations such as editing, compositing and mixing to generate the final production results. Regardless of the production phase source, media elements in conventional post-production 14 are in sampled formats: visual elements are captured or rendered 2D images (image stills or image streams), sound elements are captured or rendered audio streams.

The rendering process at the conclusion of synthetic media production 13 transforms synthetic media elements into sampled representations, so that only sampled representations are used in the post-production phase 14. All combinations of visual elements in the post-production phase 14 are done using 2D sampled images (as they were captured or rendered from a specific place in 3D physical or virtual space). There is no automated method to transfer and use any underlying geometric or spatial models, or any motion paths, created within synthetic media production 13.

Intended interactions between separate 2D sampled visual elements, and any related spatial placement and acoustic adjustment of audio elements, must generally be manually interpreted and constructed from multiple layers of 2D images in post-production 14. Any differences in the way individual media elements were captured or rendered are similarly manually determined and corrected. Corrections and adjustments to individual elements and their combinations can include changes to relative perspective, occlusion, lighting, shadows, reflections or acoustics.

FIG. 1 also illustrates an integrated technique for media production which, according to the invention, includes the introduction of an integration process 15.

The integration process 15 stretches from the end of pre-production 11 through the beginning of post-production 14, provides a connective bridge between live/recorded media production 12 and synthetic media production 13, and supports new capabilities and increased flexibility during post-production 14.

While the integration process 15 can be used across all of the phases of creating media productions, it can also be applied to any individual phase or combination of phases.

The integration process 15 has five major functions: analysis 16, image/stream processing 17, abstract object processing 18, choreography 19, and finishing 20. In general, image/stream processing 17 provides for actions for capturing, manipulating and playing media elements from live/recorded production 12. Abstract object processing 18 provides functions for the creation, manipulation and rendering of abstract objects. It also provides the interfaces to graphics/animation systems used in synthetic production 13.

Analysis 16 allows the integration process 15 to more effectively incorporate the results of live/recorded media production 12 by extracting information about the visual streams from live/recorded production 12, as captured by image/stream processing 17. This enables the creation of one or more scene models. The information extracted is stored as image-based data objects, abstraction-based data objects and other data objects in the scene model. Objects in the scene model can then be mapped into a virtual stage used in choreography 19 and subsequent finishing 20.

Analysis 16 is a computer-assisted function for deriving information about the 3D structure and temporal dynamics of the physical objects in the scene, about the cameras or other imaging devices used to capture the scene, and about the lighting of the scene. The analysis process 16 creates scene models which can include 3D image-based objects which are models of the physical objects represented in the visual stream, as well as related objects and data such as motion mattes, depth mattes, motion paths and related information from and about media elements captured in live/recorded production 12 such as the camera and lights used. This is done through a combination of image processing algorithms adapted to the requirements of this invention and guided, refined and supplemented through user interactions.

Within the virtual stage, data object representations of both physical and synthetic objects are manipulated and choreographed. Ultimately, the manipulated objects provide the basis for a 2D image sequence output and/or detailed choreography specification.

An example of the analysis of image streams to develop a scene model is contained in a copending U.S. patent application filed on even date herewith entitled "Adaptive Modeling and Segmentation Of Visual Image Streams," by Paul B. Madden, Philip R. Moorby, John S. Robotham and Jean-Pierre Schott, and assigned to SynaPix, Inc., the assignee of the present invention, and which is incorporated herein by reference.

The integrated virtual stage enables the user to view a model of combined objects of either physical and/or synthetic origin at an early stage, even before any images of the physical objects are actually available, thus facilitating not only post-production but also facilitating preproduction and production. During early stages of production, for example, image-based objects can be derived from image streams containing proxy actors who stand in for the more expensive actors who will ultimately perform. In this way, they can be choreographed to a near final product before the final actor is asked to perform. Similarly, synthetic objects, which are also very expensive to develop, can be choreographed using simplified proxies until the full requirements of a complete performance have been determined. Finally, because the final media product may be mostly if not entirely generated from the 3D virtual stage, expensive layering and other post production processes can be avoided.

The information which defines the 3D virtual stage can be generated synthetically from abstract models of the physical scene, or derived from one or more image sequences taken from the physical scene using the scene model of that image sequence, or reflect some combination of both techniques. A scene model defines the relationships between and among image-based representations and 3D abstract object models of objects within the scene along with other information, parameters and annotations supplied by the user or other sensors.

Scene models provide 3D spatial, geometric, texture, lighting and related information about the set or location where each live/recorded media element was captured. The computer processing of scene models using the analysis function 16 can be enhanced and supplemented with set parameters provided by the user. These set parameters may include information concerning the geometry and characteristics of the set (or location) and/or the lighting, cameras, and microphones used during the capture process.

Through the analysis function 16, objects in the scene model can be properly placed into the virtual stage. These objects can then be correlated, manipulated and combined in relation to other objects through the choreography 19 and finishing 20 functions.

Abstract object processing 18 provides, as one of its functions, an interface between the integration process 15 and synthetic media production 13. This interface can be implemented as either a separate module within abstract object processing 18, and/or through one or more software plug-in modules to software packages for synthetic production.

The abstract object processing function 18 imports synthetic models and synthetic motion paths created in a conventional synthetic production 13 as abstract objects into the integration process 15 for use in choreography 19 and finishing 20.

Abstract object processing 18 may also process abstract objects produced by the analysis function 16 from image/stream processing 17. Objects and motion paths created or modified within the integration process 15 can also be exported to synthetic production 13 through the abstract object processing function 18.

The choreography function 19 is for planning and rehearsing the choreographed interactions between multiple live/recorded and/or synthetic media elements. The choreography function 19 can use live/recorded media elements, the image-based objects, and/or the abstraction-based objects derived from these media elements through the analysis function 16. Similarly, the choreography function 19 can use the synthetic models and synthetic motion paths imported and/or created through abstract object processing 18. Choreography 19 is based on combining the unified 3D virtual stage with a common representational framework for specifying the temporal and spatial relationships between all the objects and elements in the media production (the choreography specification).

The finishing function 20 takes the results from the choreography function 19, and previews critical aspects of rendering the combined elements and objects (such as lighting, shadows, reflections, and acoustics) and allows interactive adjustment by the user. The finishing function 20 prepares the choreographed elements and objects for final rendering into sampled representations (2D image streams and audio streams), and performs the required rendering, directly or through separate visual rendering and audio rendering/mixing systems. Any final corrections and adjustments to the rendered results (in their sampled representations) can be made interactively by the user through the finishing function 20. This rendering can be done in a piece-wise fashion, with the finishing providing the capabilities to blend and mix the individually rendered segments into a final finished result.

The output of the finishing function 20 can be sent to the post-production process 14. The finishing function 19 can be done either before or during the post-production process 14. It is intended to supplement and/or replace many of the functions traditionally accomplished in post-production. In some cases, it is possible to completely or partially bypass the traditional post-production process 14 and directly use the results of the finishing function 19 as completed media productions or completed segments of a media production.

In some media productions, the creation of the final media product (as seen and/or heard by the ultimate consumer of the end product) is done on a separate computer or computer-based system, possibly under interactive control. In this case, the output of finishing 20 is a suitable form of the choreography specification along with whatever image-based representations and/or abstraction-based objects and models are required, including rendered elements.

Figure 2:
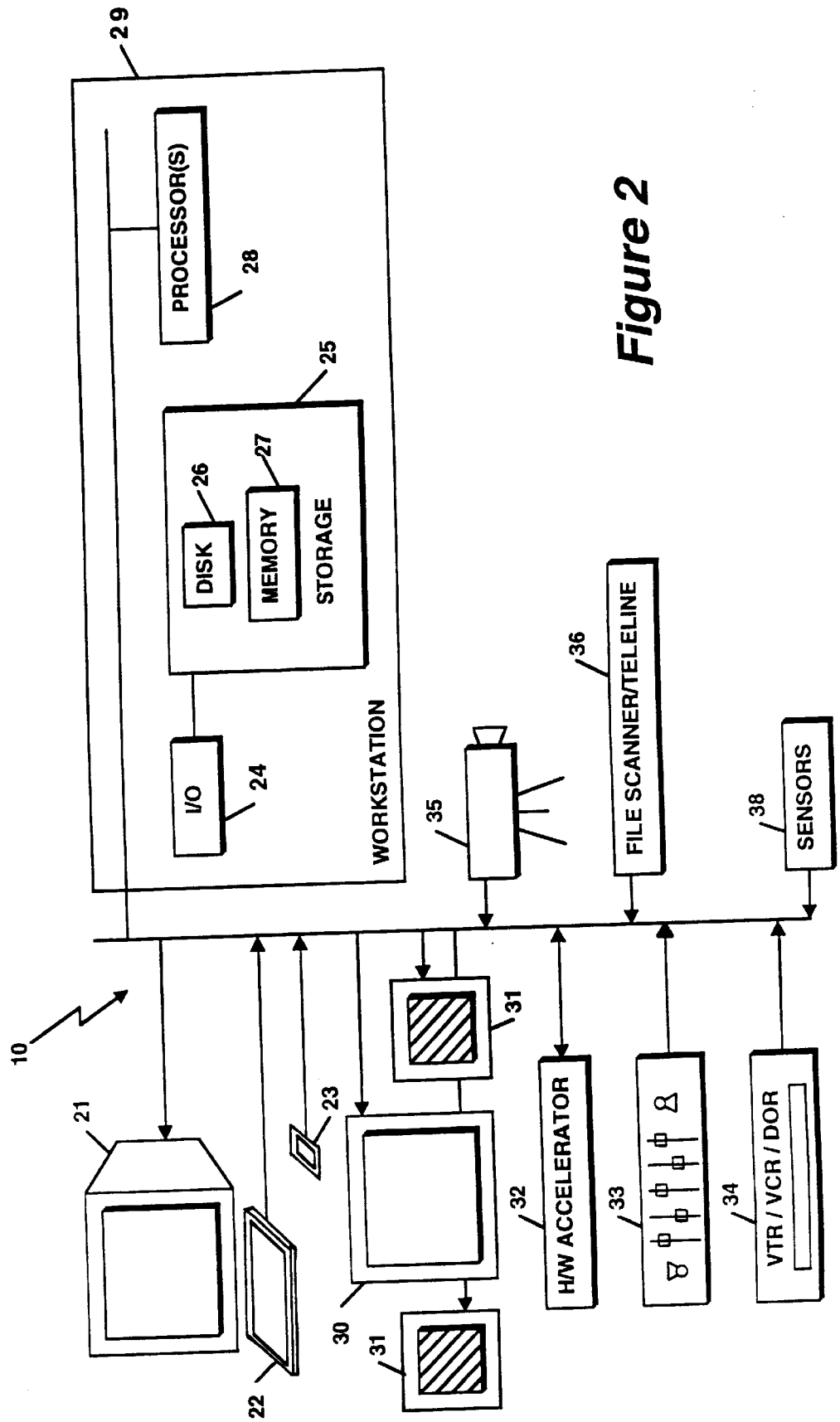
FIG. 2 is pictorial representation of the hardware elements of the system.

FIG. 2 is a representation of the hardware components of the integrated production system (FIG. 10). The system 10 includes a computer workstation 29, a computer monitor 21, and input devices such as a keyboard 22 and mouse 23. The workstation 29 also includes input/output interfaces 24, storage 25, such as a disk 26 and random access memory 27, as well as one or more processors 28. The workstation 29 may be a computer graphics workstation such as the O2 or Octane workstations sold by Silicon Graphics, Inc., a Windows NT-type workstation or other suitable computer or computers. The computer monitor 21, keyboard 22, mouse 23, and other input devices are used to interact with various software elements of the system existing in the workstation 29 to cause programs to be run and data to be stored as described below.

The system 10 also includes a number of other hardware elements typical of an image processing system, such as a video monitor 30, audio monitors 31, hardware accelerator 32, and user input devices 33. Also included are image capture devices, such as a video cassette recorder (VCR), video tape recorder (VTR), and/or digital disk recorder 34 (DDR), cameras 35, and/or film scanner/telecine 36. Sensors 38 may also provide information about the set and image capture devices.

The manual user interface 23 may contain various input devices such as switches, slides, buttons, joysticks, tablets and the like to permit the manipulation of objects in the integration phase 15. The audio and video monitors 24 and 25 are used to review any combination of audio and visual objects at any time during the integration phase 15. Finally, the hardware accelerator 26 may include equipment to rapidly perform operations to support the analysis 16, and/or choreography 19 and/or finishing 20 functions.

Figure 3:
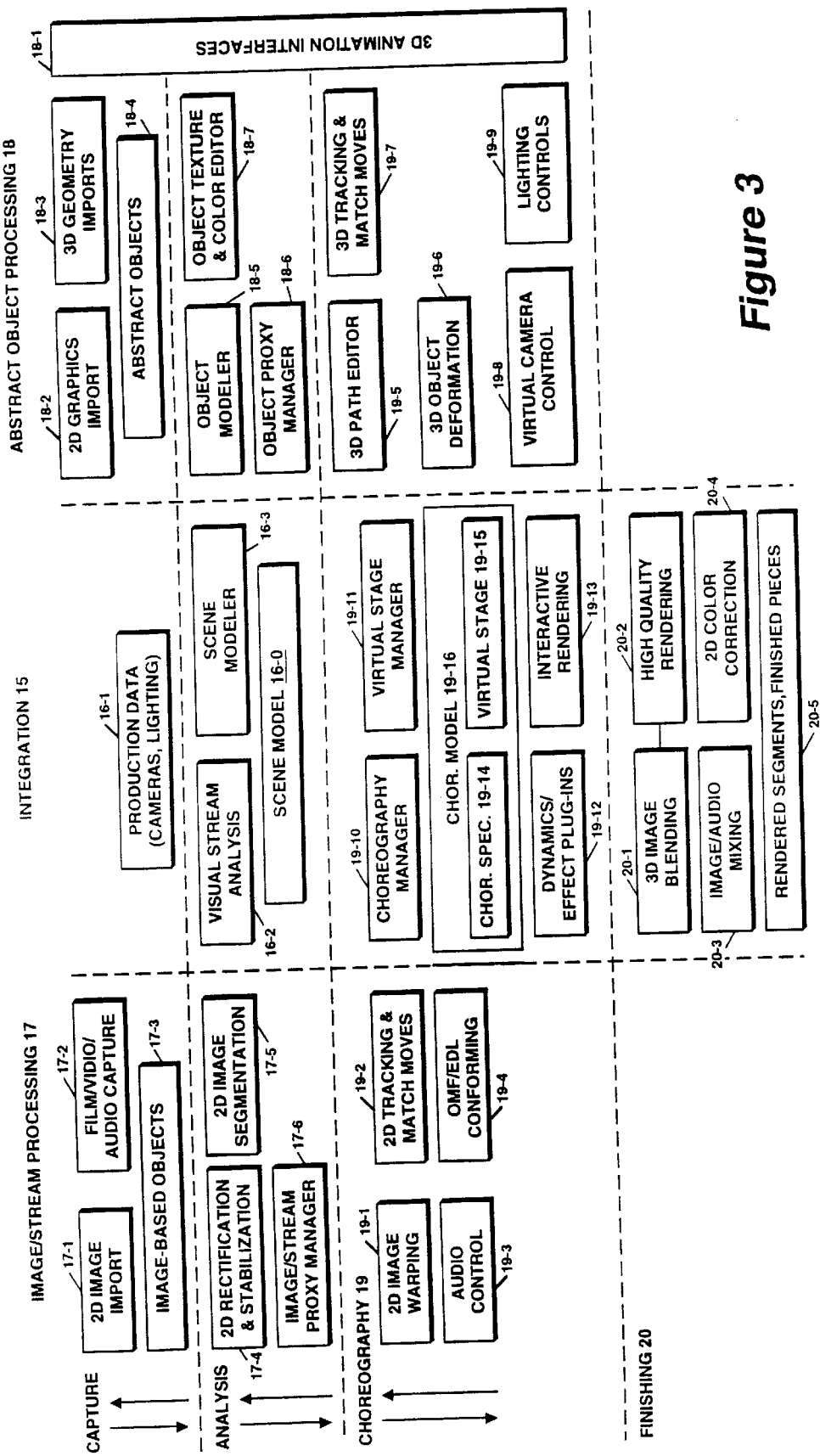
FIG. 3 is a software system architecture diagram of the iterative finishing system.

FIG. 3 is a more detailed software architecture diagram of the integrated media production system 10. The various software modules in general carry out the functions of the integration process 15. These software components of the system 10 may typically be implemented using object oriented programming languages and data base structures.

The various software modules can be grouped by the general function or functions to which they interface as indicated by the dashed horizontal and vertical lines. For example, image/stream processing 17 and abstract object processing 18 modules may further each be divided into modules that support the capture, analysis, choreography and finishing process steps. Note that these process steps are generally sequential in nature, but multiple iterations between and among steps as selected by a user of the system 10 must also be supported.

The modules that implement the integration phase 15 generally include the various modules shown in the middle section of FIG. 3 between the dashed lines, as supported by the modules in both image/stream processing 17 and abstract object processing 18.

The image/stream processing modules 17 are principally concerned with the integration between live/recorded media stream production 12 and the integration phase 15. These include various modules devoted to media capture, such as a 2D image importer 17-1 and film/video/audio capture 17-2. These media capture processes 17-1 and 17-2 result in the creation of various types of two dimensional (2D) visual data objects or one dimensional (1D) audio data objects. These various data objects are collectively referred to herein as image-based data objects 17-3 that represent various live/recorded media elements. These image-based objects 17-3 typically include image map data representing all or part of the sampled visual portion of a media element and/or audio data representing sampled audio information. The resulting image-based objects 17-3 may be stored in a data structure called the object catalog.

To support the analysis phase, image/stream processing 17 can include 2D rectification and stabilization modules 17-4, a 2D image segmentation module 17-5, and an image stream proxy manager 17-6. The 2D rectification and stabilization process 17-4 operates on image-based data objects to compensate for lens distortion, camera shake and other distortions created during image capture. The 2D image segmentation modules 17-5 separate individual portions of individual images of interest as segmented data objects. Segmented objects, for example, may include selected portions of the image map data from a given image-based data object 17-3 of interest.

The image/stream proxy manager 17-6 may accept image-based data objects as inputs and produce other image-based objects such as image pyramids of varying resolution. The proxy manager 17-6 may, for example, given a visual image of a particular resolution, produce a pyramid representation consisting of multiple image-based data objects that each represent a successively lower resolution version of the input image. The successive lower resolution levels of the image pyramid may be in terms of both color resolution and as spatial resolution.

Turning attention now to the right-hand side of FIG. 3, the abstract object processing modules 18 are principally concerned with the interface between the synthetic media production process 13 and the integration process 15. These modules may make use of available interfaces 18-1 to selected 3D graphic, animation or synthetic audio systems. These 3D animation interfaces 18-1 therefore can import and/or export a number of different types of synthetic or "abstraction-based" objects, including geometric object models, motion paths, surface textures, synthetic cameras, synthetic lights, dynamic specifications, and other related information.

Other synthetic objects can be imported into the object catalog as abstract objects 18-4 through a 2D graphics import module 18-2, as well as additional 3D object models imported through the 3D geometry import module 18-3.

Abstract object processing 18 functions to support the analysis phase can include an object modeler 18-5, an object proxy manager 18-6, and object texture and color editor 18-7.

The object modeler 18-5 and object texture and color editor 18-7 permit the user to modify imported abstract objects and/or construct further synthetic model objects 18-4. For example, the user may use an external animation system to produce an initial version of an object but thereafter wish to edit the synthetic objects 18-4 and/or combine it with data available from other systems. The object texture and color editor 18-7 further permits the user to define the visual aspects of a synthetic object such as its surface texture and colors.

The object proxy manager 18-6 provides a function analogous to that of the image proxy manager 17-6. In particular, a given synthetic object 18-4 may actually be defined as a hierarchical set of synthetic data objects with each specifying a different level of geometry detail, a different representation of surface texture, or other levels of synthetic object detail.

A production data import module 16-1 provides data concerning a production environment such as the physical position of cameras and lighting. The parameters are stored as camera objects and light data objects, respectively.

The analysis process 16 is implemented by a visual stream analysis module 16-2 and scene modeler 16-3. The visual stream analysis module 16-2 analyzes input visual streams to produce image-based objects 17-3 and estimated parameters for use by the scene modeler 16-3. The visual stream analysis module 16-2 also analyzes input image streams captured from physical objects in a physical object space to define the parameters of the 3D virtual stage.

The scene modeler 16-3 is responsible for developing one or more scene models 16-0. Each scene model 16-0 is hierarchical data object consisting of a list of the objects represented in a given scene, such as image-based objects 17-3, abstract objects 18-4, related cameras, lights and other production related data objects. Scene models 16-0 are developed using the results from the visual stream analysis module 16-2 and other data objects. A number of different image processing algorithms may also be used to derive information for building a scene model 16-0 from the input visual streams.

The scene modeler 16-3 may also combine this image-derived information with the synthetic objects imported as abstract objects 18-4.

The visual stream analysis 16-2 and scene modeler 16-3 also interact with one another to develop an object correlation mesh data structure in the scene model 16-0 that represents structured associations between objects of various types. For example, a segmented image-based object that represents an image of a table taken from an input media stream can be linked to one or more synthetic objects of the table provided by the object modeler 18-5.

As the scene modeler 16-3 develops a scene model 16-0, an inverse projective transform is created which relates information from the 2D image plane of a given image stream (typically taken from the perspective of the camera which captured the image stream) back to a scene coordinate system. The abstract objects 18-4 derived from a given visual image stream are thus defined with respect to this scene coordinate system, and their spatial relationship to corresponding image-based objects 17-3 is defined in part by this projective transform.

In order to manipulate and choreograph objects from a scene model 16-0 within the virtual stage, a mapping is typically specified. This mapping relates the scene coordinate system to a stage coordinate system of the virtual stage.

The virtual stage is a data structure within which the user may choreograph the production. The virtual stage includes a specification for the stage coordinate system, a list of objects as represented in one or more scene models 16-0, abstract objects, camera objects, light objects, acoustic objects, and other objects needed for choreography.

Similarly, abstract objects 18-4 are also typically defined within their own abstract coordinate system. Therefore, a mapping from this abstract coordinate system to the stage coordinate system of the virtual stage is also provided.

The choreography modules 19 are principally responsible for specifying how various data objects interact with one another to obtain a desired production result. The choreography process makes use not only of the previously mentioned list of image-based objects 17-3 and abstract objects 18-4, but also any related data and parameters from the scene model 16-0 and virtual stage 1915.

On the image/stream processing 17 side, the modules to support choreography 19 can include image warping 19-1, 2D tracking and move matching 19-2, audio control, and offline editing conforming 19-4.

Image warping 19-1 modules provide the ability to specify various warping operations to be performed on input image-based objects 17-3. 2D feature tracking modules 19-2 provide matching of image-based objects 17-3 with associated 2D path objects. Offline edit conforming 19-4 allows the manipulation of image-based objects 17-3 that need to be played back in a particular frame sequence in accordance with inputs provided from an external editing system.

On the abstract object processing 18 side, the modules that support choreography 19 can include a 3D path editor 19-5, 3D object deformation 19-6, 3D tracking 19-7, camera control 19-8, and lighting controls 19-9. The path editor 19-5 permits the user to specify paths of abstract objects 18-4. Object deformation 19-6 allows the specification of deformations to objects that simulate the results of gravity, collisions, pressure, and other physical interactions. Object deformation 19-6 can also be used to correct for errors introduced during the analysis function 16.

The 3D tracking modules 19-7 provide a function analogous to the 2D tracking 19-2 for the abstract objects 18-4. Camera control 19-8 and lighting controls 19-9 provide the user with further ability to specify and modify the parameters of virtual camera and light objects.

Within the integration 15 and choreography 19 processes there are a number of other modules, including a choreography manager 19-10, a virtual stage manager 19-11, a dynamics/effects plug-in interface 19-12, and interactive rendering module 19-13. These processes further develop a data structure referred to as the choreography model 19-16 that includes a choreography specification 19-14 and the virtual stage 19-15, as well as other objects necessary to characterize the choreography of the scene.

The choreography specification 19-14 provides a framework for specifying temporal and spatial relationships of various objects in the choreography process. It is a data structure that incorporates all of the information required to generate a choreographed scene from the list of image-based objects 17-3 and abstract objects 18-4. The data structure can be displayed to the user, exported, or imported as a descriptive or declarative language.

The choreography manager 19-10 provides a timeline representation of the choreography specification 19-14. This controls the specification of a hierarchical time line that defines the appearance of the elements of a scene, their temporal relationships and other framing aspects of the scene. This provides the user a way to describe, view and control the temporal flow of a particular choreography model.

The virtual stage manager 19-11 maintains and manipulates the current state of the virtual stage 19-15. The virtual stage manager 19-11 maintains the definition of a current state of the choreography model 19-16 cooperating with the choreography manager 19-10. The virtual stage 19-15, for example, describes the current state of all objects 17-3 and 18-4 for a particular frame, whereas the choreography specification 19-14 maintains how the virtual stage 19-15 changes over time.

The plug-in interface 19-12 can provide a way for an application programming interface (API) to access various elements of the choreography model, object catalog or other portions of the system 10.

The interactive rendering module 19-13 provides the user with a visual and audio preview of the choreography model 19-16 whenever requested, such as by rendering a visual representation of the choreography model. The choreography modules 19 also provide information to finishing modules 20.

The finishing modules 20 provide interactive control over the process of preparing, rendering, correcting and adjusting finished production segments. This process may include modules such as image blending 20-1, high quality rendering 20-2, image/audio mixing 20-3, and color correction 20-4. The finishing process 20 outputs a number of data structures representing rendered segments 20-5 and other pieces of finished media. These pieces of finish media can themselves be stored as image-based objects 1713.

High quality rendering modules 20-2 and image blending 20-1 accept the choreography specification 19-14 and related objects in the choreography model 19-16 as inputs and provide a finished result in the desired sampled format such as output visual streams and audio streams. The rendering process 20-2 may either use its own rendering system or control the use of external rendering systems. The image blending modules 20-1 determine, such as on a pixel-by-pixel basis, how each frame of the resulting finish rendering should use the image-based objects 17-3, abstract objects 18-4, correlation mesh, and other information in the choreography model 19-16 to provide the finished result. The audio mixing module 20-3 insures that audio objects are appropriately mixed and synchronized with visual objects. A color correction module 20-4 provides an ability for the user to adjust colors once the image is in the output format.

Turning attention now to FIG. 4, the development of the scene model will be described in greater detail. The scene model 40 (corresponding to item 16-0 in FIG. 3) is a mechanism for achieving a unified representation of a scene which supports both image-based model objects 50 (17-3) and abstraction-based model objects 60 (18-4). The scene model 40 creates a common context for working with all object types 50 and 60, to permit the user to create renditions of the scene using both object types, with a high degree of confidence that the end result will be satisfactory. During the operation of the invention, the scene model 40 evolves into a unified representation of the scene and its dynamics, including correlations between the image-based objects 50 and abstraction-based objects 60 modeled in the scene, as reflected in the correlation mesh 80.

An exemplary scene model object 40 includes a spatial reference model 41, a list of objects 43 in the scene, other scene-related data objects 70, and the correlation mesh 80.

The spatial reference model 41 typically defines a scene coordinate system 41-1 for the physical scene that occurs in the natural physical universe, such as determined by the analysis algorithms 42 or sensors 38, from which the visual image stream was taken. The scene coordinate system 41-1 is then used as the basis for defining image-based objects 50, related abstraction-based objects 60 and actions thereon.

The spatial reference model 41 can also define an abstract coordinate system 41-2 for a synthetic scene such as originally created in a computer application such as a computer-aided design (CAD), computer graphics, or computer animation system. Visual stream(s) rendered from this synthetic scene can then be analyzed through image-based analysis techniques that are similar to those applied to streams of actual captured images from physical scenes, as will be described shortly. This can be done when an initial scene model 40 is not available or accessible, and the scene model 40 must be first derived, in whole or part, by analyzing the visual image streams.

The spatial reference model 41 of each type includes a space definition such as a volume inside a regular parallelopiped. This is typically a three-dimensional space bounded on each side by a rectangle, with opposite rectangles of the same size and relative orientation. The coordinate system is typically the Cartesian (X,Y,Z) system, with coordinate grid being linear in all three dimensions. Bounding planes are typically used to define the top, bottom, far left, far right, front, and back of the spatial reference model 41, with the point (0,0,0) being the intersection of the front, bottom, and far left bounding planes.

The scene model 40 also includes a list 43 of image-based 50 and abstraction-based 60 objects in the scene. In its simplest form, the object list 43 may simply be a collection of image-based objects 50-1, 50-2, . . . , 50-$i$, and abstraction-based objects 60-1, 60-2, . . . , 60-$j$.

However, any object may also be defined as a hierarchical object structure, where one object is composed of various constituent sub-objects. For example, an image-based object 50-$h$ may consist of an image pyramid of a set of pixel regions 50-$h$-1, . . . 50-$h$-$j$. Likewise, an abstraction-based object 60-$h$ representing a person may have sub-objects 60-$h$-1, 60-$h$-2, . . . , 60-$h$-4 that represent the arms, legs, head, and torso of the person, respectively. These sub-objects may themselves be composed of other sub-objects.

A typical scene model 40 is also dynamic in the sense that it can include a set of abstract operations 78 that are applied to the objects in the list 43. These abstract operations 78 are typically used to specify changes and movements of objects over time in the scene model 40, and can be defined in whatever terms are appropriate to the scene model 40, such as mathematical or geometric transformations (e.g., motion paths, surface deformations), or procedural animations (e.g., software instructions that specify an object's "behavior" and/or modify the object's properties over time).

To further permit realistic renditions from the scene model 40, representations of other physical objects in the scene such as lighting objects 74, camera objects 75, and viewing objects 76 are also included. Lighting objects 74 represent sources of lighting on the set (or location); camera objects 75 represent cameras; and viewing objects 76 represent the point of view of an observer. Lighting objects 74 and camera objects 75 are defined as a type of abstract object 60, whether derived from image analysis or user inputs.

Proxy objects are three-dimensional objects to be correlated with, and eventually replaced by, either an image-based object 50 (as isolated from a digitized film/video clip or rendered animation) or another three-dimensional abstract object 60. There can be multiple levels of proxy objects 79 for the same input object, maintained by the system as a proxy set. This gives the user access to different versions of the object, to accommodate object and data exchange with other applications, and to permit interactive finishing as will be described below.

The correlation mesh 80 contains a list of links 80-1, 80-2, . . . , 80-$c$ between specific image-based objects 50 and abstraction-based objects 60. The correlation mesh 80 serves in its simplest form to store links between an image-based object 50 and an abstraction-based object 60 of a given physical object in the scene. The correlation mesh 80 thus provides an easy way to switch between multiple possible renditions of the same physical object.

The correlation mesh 80 can also maintain multiple links between various object representations 50 and 60, and to iteratively examine and refine each such representation, resulting in a composite unified scene model 40 that has the advantages of both model types.

In particular, as the abstraction-based objects 60 of the scene are created and refined, the corresponding image-based objects 50 are also analyzed and annotated with information about the physical (or synthetic) scene that they represent. These annotations provide the basis for links to converge between multiple abstraction-based 60 and image-based 50 representations. The linkages between these two models are organized as the separately accessible correlation mesh 80. The process of converging between the abstraction-based 60 and image-based 50 representations is implemented by increasing the density and accuracy of linkages in the correlation mesh 80, and additions, corrections, deletions, and other modifications to the image-based objects 50 and abstraction-based objects 60.

These linkages in the correlation mesh 80 can be generated through presentation of the scene model 40 through a scene viewer, and prompting the user for feedback through a user interface. Alternatively, the correlation mesh 80 can be automatically annotated, in a manner described herein.

As a result of having both an image-based 50 and abstraction-based 60 model of a given object in a scene, synthetic segments that emerge from a world of computer graphics and animation can therefore be more easily coordinated with live/recorded image streams to create finished media content that blends both types of elements.

Indeed, it is sometimes required that the same object be rendered in both media and synthetic form, since what is typically hard to create with one is typically easier in the other. For example, in a production like the movie "Jurassic Park," both a physical model and a computer model are typically made of an object such as a dinosaur. Depending upon which effect is desired in a particular scene, recorded images of the physical model may be first stored as image-based objects 50. Computer-generated synthetic segments may also be derived and stored as an abstraction-based objects 60. For example, when a dinosaur is to be shown traveling rapidly through a scene, a synthetic abstraction-based object 60 may be used. As the dinosaur slows down, a switch may be made to the recorded media segment, such as taken by a motion controlled camera shot of the model, as stored in one of the image-based objects 50.

The correlation mesh 80 also supports the tracking of image features across multiple image-based objects 50.

This tracking be done on successive images from the same image stream, or from different but related streams. If these image feature objects are also linked to a common feature in an abstract-based object 60, different image representations of the same feature can be located through the linkages in the correlation mesh 80.

The ability to add annotations that create linkages in the correlation mesh 80 is central to the adaptive process of converging the image-based 50 and abstraction-based 60 object representations of the scene. By allowing the user to guide and control the convergence process, the result is higher quality analysis of the input image streams, better annotations of these streams, a more detailed and realistic scene model 40, and a denser and more complete set of linkages in the correlation mesh 80. These annotations, models, and linkages can then be used for further image-based analysis and abstraction-based modeling 60 of the scene. As this adaptive process continues, more accurate and useful information is successively obtained about the scene and its dynamics.

Furthermore, the user can improve the efficiency of the entire process by continuously determining which aspects of the scene are important, and which types of refinements are needed on successive iterations.

Additional details of the scene model 40 are described in a corresponding United States patent application entitled "Adaptive Modeling And Segmentation Of Visual Image Streams," by Paul B. Madden, Philip R. Moorby, John S. Robotham and Jean-Pierre Schott filed on even date herewith and assigned to SynaPix, Inc., the assignee of this invention.

During finishing 20, an image rendering process uses the choreography model 14-16 to display the output image frame sequence. For interactive scene playing, the image renderer may preferably be in an open standard format such as Open GL™. For higher quality rendered results, the state of the virtual stage 19-15 at each frame time may be output to a file format used by the rendering system of choice. Similarly, an audio mixer process uses the scene graph to mix the output to the next segment in the choreography model 19-16 and assembles the required data structures.

Figure 5:
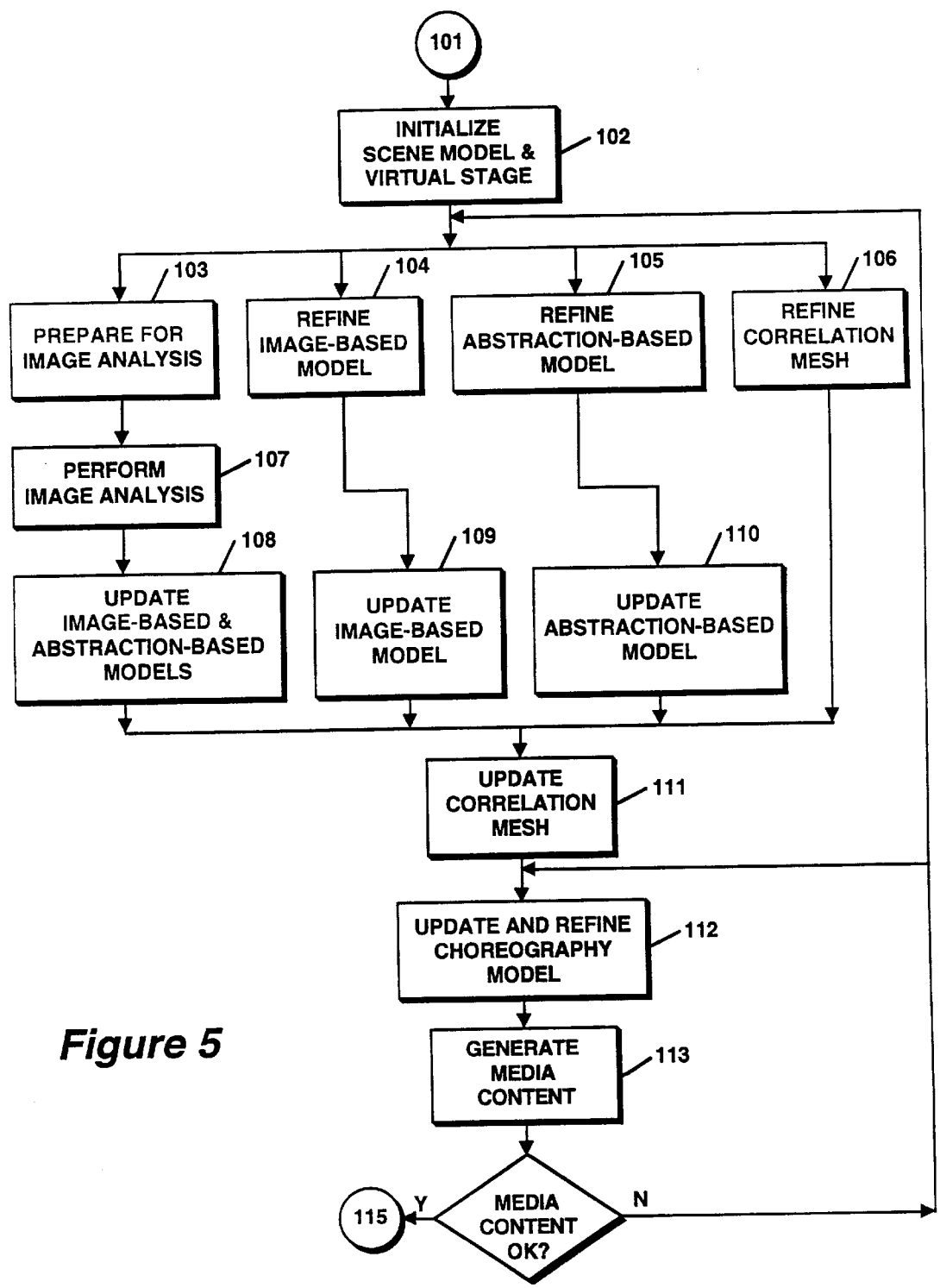
FIG. 5 is a detailed flow diagram of the process for iterative finishing according to the invention.

FIG. 5 is a flow chart of one possible series of operations performed by the system 10 to control the level of detail in the finishing process 20 through iterative analysis 16 of the live/recorded image streams.

The process begins from an initial state 101 proceeding to state 102 in which the scene model 40 and its constituent components are initialized. This includes creating an initial version of abstraction-based models 60, image-based models 50 and correlation mesh 80. The initial abstraction-based model 60 may contain certain assumptions such as the parameters for the spatial reference 41. If one or more aspects of the scene model 40 have already been initialized, then these initialization functions can be skipped. In state 102, the virtual stage is also initialized.

From state 102, the process proceeds to an iterative loop. There are four different paths through this loop, represented by state 103, state 104, state 105 and state 106. At each iteration of the loop, the choice of which path to take can be made automatically or with input from a human operator. It is also possible to execute two or more of these paths in parallel.

State 103 and successive states 107 and 108 perform an automated image analysis function with optional control from a human operator. This begins with state 103, which prepares for image analysis 16 by selecting the image-based objects to be used in the analysis. This selection process can include "masking out" those regions and/or frames not relevant to this iteration of the analysis. This masking process can prevent the inclusion of regions and/or frames that had previously caused an analysis algorithm to produce ambiguous or incorrect results. State 103 can be done through an automated process or under the control of a human operator.

At state 103, various parameters for the image analysis function can also be determined. This can include the choice of which image analysis algorithm(s) to use, the sequencing of these algorithms, and how to use the output(s) of one algorithm as input(s) to another.

State 103 is followed by state 107, in which the image analysis 16 is performed. Image analysis may include any of the aforementioned processes for analyzing an image frame or image sequence. In state 108, the results of this analysis are applied to updating the image-based model 50 and the abstraction-based model 60. This is followed by state 111, which applies the analysis results, along with any changes made in state 108, to update the correlation mesh 80.

State 104, followed by state 109, allows the human operator to refine the image-based model 50. This includes adding, changing and deleting any object or group of objects in the image-based model. In state 104, a human operator can provide the input to make these refinements to the image-based model. In state 109, these refinements are applied and the image-based object model is updated. This is followed by state 111, in which the results of state 109 are used to update the correlation mesh 80.

State 105, followed by state 110, allows the human operator to refine the abstraction-based model 60. This includes adding, changing and deleting any object or group of objects in the abstraction-based model. In state 105, a human operator can provide the input to make these refinements to the abstraction-based model. In state 110, these refinements are applied and the abstraction-based object model is updated. This is followed by state 111, in which the results of state 110 are used to update the correlation mesh 80.

State 106 allows a human operator to refine the correlation mesh 80. This includes adding, changing and/or deleting any linkage or other property of the correlation mesh. This is, in turn, followed by state 111, in which these refinements are applied and the correlation mesh is updated.

As previously discussed, state 111 updates the correlation mesh 80 based on the results of either or all of states 106, 108, 109 and 110.

This is followed by state 112, in which the one or more aspects of the choreography model 19-16 are updated. The human operator can determine in state 112 which aspects of the scene model 40 are to be included in the virtual stage 19-15, modify these objects and data as required, and then specify time-based operations on these objects and data through the choreography specification 19-14. Once these have been established and refined in any given iteration of state 112, updates can be applied to the choreography model 19-16 based on the results of any or all of states 108, 109, 110 and/or 111. In state 112, the human operator can select and use objects and data from a single scene model 40, or from multiple scene models 40 generated from different live/recorded and/or synthetic scenes.

State 113 generates a two-dimensional finished image representation from the choreography model 19-16. During this state 113, the finished representation is provided typically by accepting the choreography model 19-16 data as inputs and performing a rendering, blending, and mixing of finished quality. This includes the notion of blending multiple image-based objects such as by using associated mattes or depth information.

Each output image frame represents a 2D projection of the 3D virtual stage onto the image plane of the specified virtual camera 75. This process can include the rendering of abstract objects into image-based objects and blending these with other image-based objects. In addition, if the rendering is to be a stream of images, then use is made of the choreography specifications 19-14 as previously described. The view of the finished output image stream (typically of the post-production quality) is then presented to the user via the high resolution display 30. If synchronized audio has also been generated, this can be simultaneously output via the audio monitors 31.

In state 115, the post-production process 14 may then be entered with a high degree of confidence that the resulting image stream (and audio) will be of acceptable quality.

Successive iterations of the steps of FIG. 5 may typically use successively more detailed and refined versions of the image based objects in state 104 or abstraction-based objects in state 105. For example, an initial rendering may be attempted with a relatively low-resolution level of an image pyramid object in state 104, with successively high resolution levels selected until the desired result is obtained in state 114. Similarly, successive iterations of state 105 may select increasingly more detailed versions of abstraction-based objects.

Figure 6:
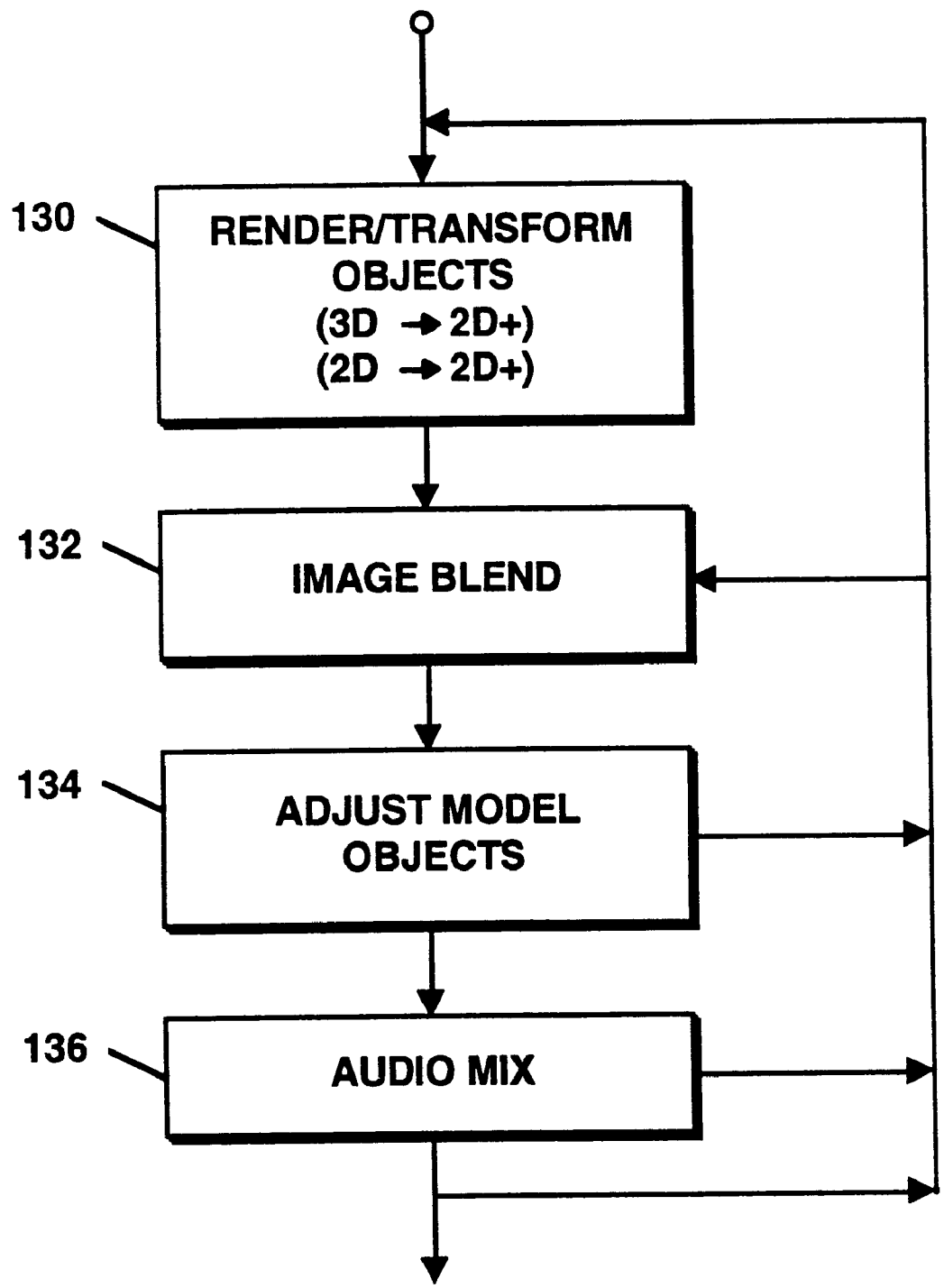
FIG. 6 is a detailed flow diagram of the finishing process.

FIG. 6 is a more detailed flow chart of the operations which are used in the finishing process in state 113 of FIG. 5. In general, a first state 130 includes the presentation of a finish-quality rendering and/or image transformation of one or more objects in the choreography model 19-16. This is accomplished by calculating projections of the objects in the choreography model 19-16 from the virtual stage in which they are defined to a 2D viewing space as specified by a camera object 75 or other viewing object 76. Techniques such as graphic projection, ray tracing, and other 3D to 2D or 2D to 2D transformations can be used to accomplish this.

Additional information is preferably maintained in the choreography model 19-16 for each object to enable proper rendering of certain effects. For example, depth information is preferably maintained as a data value for each pixel in the finished 2D rendering of each object. In addition, transparency "alpha" information relating to the transparency of each pixel is also maintained with the 2D rendering of each object. This alpha information can be stored with the object in the virtual stage and/or represented as a separate matte object. These permit proper rendition of inter-object effects such as shadows, reflections and/or refractions, as well as image distorting effects such as atmospheric, spatial, object geometry, morphic, and dynamic texturing. Similarly, surface normal information may be retained for each object to assist in interpreting spatial properties of object surfaces.

For example, a scene may include a piece of fruit, such as an orange, sitting on a table. The scene may be shot with a camera and recorded in the scene model 40 as a first image-based object 50-a. The orange may be segmented from the image stream and stored as another image-based object 50-b. In addition, the orange may be represented in the scene model 40 as a sphere within an abstract object 60-a referencing both of the image-based objects 50-a and 50-b. References to these objects are then placed into the choreography model 19-16.

At the render/transform step 130, the view is rendered by supplying the spherical abstract object 60-a and segmented image 50-b to the rendering system. The spherical abstract object is then used to define the shape of a "wire frame" for rendering the object, with the segmented image 50-b of the orange supplying a texture to be placed over the wire frame. The 2D projected pixel data values are then determined. Alternatively, the image 50-b might be used directly as the 2D image representation if the specified virtual camera in the virtual stage corresponds with the parameters of the camera used to capture the original image 50-a. In this case, the wire frame model can still supply both depth and surface normal data.

In state 132, the rendered (and/or transformed) objects are then blended as required. This is preferably accomplished on a pixel-by-pixel basis by comparing the depth information for any overlapping, separately generated 2D objects, such that objects with a smaller depth are chosen to be in the foreground. Alpha information is also used to correctly determine transparency effects. The effects of separate matte objects can also be applied at this time.

In a next state 134, the user is presented with the opportunity to adjust the objects in the choreography model 19-16 as required.

For example, upon seeing the rendering of the orange, the user may decide that the color is not bright enough.

At this point, the user then adjusts the definition of the image-based object 50-b through a pixel color adjustment. At this point, it may be possible to return only to the image blend (state 132) and selectively redo the blend of the affected object(s). Otherwise, the process iterates to state 130 to re-render and/or re-transform only those objects affected in state 134. Finally, in state 136, the audio (if any) can be mixed and synchronized with the output visual stream. Based on user input, the process either iterates or ends.

In the example scene being described, the image stream object 50-a may contain a set of stairs upon which the orange is resting. The image stream object 50-a is therefore simply reated as a background against which the rendered sphere object 60-a is blended.

Depth, transparency, and other blending parameters may also be determined for each object depending upon its level of detail. For example, in image pyramid objects having relatively low resolution (or abstraction-based objects at low tessellation detail) image blending parameters such as depth and transparency may only be available for a given pixel region which consists of many finished-quality pixels. The blending in state 134 thus only uses information on a pixel region by pixel region basis. Similarly, it is possible that relatively high resolution image objects (or abstraction-based objects at high tessellation detail) may permit comparison of blending information on a sub-pixel sized basis.

Any audio objects are also mixed to generate an audio track in state 136, based upon their relative position as defined by the choreography model 19-16 and any occluding or reflecting objects 50 or 60.

FIG. 7 shows a representation of a scene including both synthetic and real objects which can be used to further understand an iterative analysis and finishing process according to the invention. For example, an input image stream may consist of a recorded media element such as a film clip taken by a motion picture camera of a real human actor 150 and a real set of stairs 152. The scene also includes a synthetic object such as a dinosaur 154 created in a computer graphics system.

During the analysis 16, image/stream processing 17 and abstract object processing 18 portions as previously described a scene model 40 is developed which includes a number of image-based 50 and abstract objects 60. For example, an image-based object 50 may exist for representing the human actor 150 and the set of stairs 152. An abstract-based object 60 is created to represent the dinosaur 154. These objects are then placed into the virtual stage 19-15.

The invention can be used in a number of different ways to improve the quality of the finish rendering in accordance with the invention.

In a first example, a light 160 originally used to create the input image stream containing the actor 150 and stairs was apparently placed in a less than ideal spot off to the left of the desired view. In accordance with the invention, if a better view of the actor's 150 face is desired, then a synthetic lighting object 74 may be placed in a position such as shown at 162 by rendering the image-based object 50 representing the actor 150, together with a synthetic light object 74 in the new position 162 as defined by the user. The actor's face then appears better illuminated by the synthetic light object 74.

In a second example of how the finish quality can be improved, it may be desirable for a shadow 164 such as projected by the dinosaur 154 to be placed on the stairs 152 so that the rendition of the scene appears more realistic. The shadow 164 is a type of effect which in the prior art would typically have to be created through multiple hand-crafted steps such as hand coloring of pixels on the stairs 152 on a frame-by-frame basis.

However, with the invention, the abstract model 60 of the dinosaur 154 can be used together with the image-based model of the stairs 152 and light objects 74 to automatically determine another abstract-based object 60 representing the shadow 164 during an iteration of the process of FIG. 5.

In a next iteration of the process of FIG. 5, a data object representing the shadow 164 can be created from the finish rendering as its own image-based object 50. The shadow itself can be represented as a sequence of differences in pixel color values and/or alpha transparency values by comparing rendered versions of the stairs with and without the rendered shadow. This resulting image-based object 50 of the shadow is typically referenced to its associated objects through links in the correlation mesh 80.

The image-based representation of the shadow 164 can then be applied in a subsequent iteration to the original detailed image-based object 50 of the stairs 152 and the dinosaur 154. In this manner, all of the details of the stairs 152 as taken in the initial image stream from the live/recorded production 12 is still available. This then avoids the need to first create a 2D representation of the stairs 152 and the dinosaur 154 and carry them through to the post-production process 14 for combination.

On further iterations of the process of FIG. 7, the invention may correct further attributes of the finish rendering. For example, an orange 166 may actually be on the stairs 152 and at some point interact with the shadow 164 cast by the dinosaur 154. In such an instance, the user may develop a representation for the orange 166 in the choreography model 19-16 as described so that the shadow 164 is also appropriately applied to the orange. Alternatively, the user may decide to remove the orange 166 from the scene entirely, "filling in" the missing part of the stairs from other images of the stairs without the orange present.

Yet another example of the advantage of the invention, at some point in the production it may be desirable for the human actor 150 to walk in front of the dinosaur 154. The dinosaur 154, being a synthetic object 60, may typically have been created through a long, involved and detailed modeling process in a computer graphics system. It is therefore highly desirable to avoid the need to recreate or re-render the dinosaur 154 in order to accommodate secondary effects such as the shadow of the human actor 150 falling on the synthetic dinosaur 154.

In such an instance, the invention permits the creation of an abstract proxy object 79 representing a simplified version of the dinosaur 154. The proxy object 79 may then be used to create the shadow of the human actor 150. The shadow can then be isolated as a separate object as was previously described and then placed in a subsequent iteration of the process with the fully detailed image-based version of the dinosaur 154.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for developing finished media content from an input visual image sequence, the input visual image sequence containing a visual representation of one or more visual objects, the method comprising the steps of:
    (a) analyzing portions of the input visual image sequence to derive a scene model in three spatial dimensions with respect to a three-dimensional object space by performing the steps of:
        (i) defining a common three-dimensional object space;
        (ii) defining an image-based data object containing a segmented pixel representation corresponding to a portion of at least one frame of the input visual image sequence within the three-dimensional object space;
        (iii) defining an abstraction-based data object containing an abstract model for at least a portion of one of the visual objects contained in the input visual image sequence within the same three-dimensional object space;
    (b) defining a choreography specification for the finished media content that includes a specification for how the data objects are to be used in creating the finished media content;
    (c) selecting an image-based data object to be modified and accepting user input parameters modifying how the selected image-based data object is to be used in the choreography specification for generating the finished media content;
    (d) selecting an abstraction-based data object to be modified and accepting user input parameters modifying how the selected abstraction-based data object is to be used in the choreography specification for generating the finished media content;
    (e) generating a two-dimensional (2D) visual image of the finished media content from the choreography specification, scene model, at least one pixel representation, and at least one abstract model; and
    (f) iteratively refining the finished media content by performing certain selected ones of steps (a) through (e) in an order as selected by user input until the finished media content is of acceptable finish quality.

2. A method as in claim 1 wherein step (b) additionally comprises:
    choreographing representations of objects within the context of a three-dimensional (3D) virtual stage.

3. A method as in claim 1 wherein at least one parameter of a virtual stage is defined by analyzing the input visual image.

4. A method as in claim 1 additionally comprising the step of, after step (a):
    storing a link in correlation mesh data object wherein the link indicates a correspondence between an image-based data object and an abstraction-based data object.

5. A method as in claim 1 wherein step (a) further comprises the step of:
defining a spatial position for the pixel representation with respect to a virtual stage.

6. A method as in claim 1 wherein the input visual image is a visual image stream comprising a time sequence of two or more image frames.

7. A method as in claim 6 wherein step (b) additionally comprises the step of:
defining a choreography specification that includes a specification of one or more time-sequenced manipulations of at least one of the abstract models in a virtual stage.

8. A method as in claim 7 wherein step (e) further comprises the step of: generating a time-based sequence of 2D output visual images from at least one of the choreography specification, the abstract models, and the pixel representations.

9. A method as in claim 1 wherein step (f) additionally comprises the step of:
during a given iteration, accepting user input specifying which of a plurality of pixel representations and which of a plurality of abstract models are used in the output generating step.

10. A method as in claim 1 additionally comprising the step of:
defining a camera model including a specification of a viewpoint of a camera used to generate the input visual image.

11. A method as in claim 10 wherein step (e) further comprises the step of:
generating the output visual image from the viewpoint of the camera as specified by the camera model.

12. A method as in claim 10 wherein the camera model additionally specifies at least one camera parameter taken from the group consisting of camera position, movement, resolution, field of view, depth of field, focal length, lens f-stop, exposure interval and orientation.

13. A method as in claim 1 wherein the visual object in the input visual image comprises a physical object.

14. A method as in claim 1 wherein the visual object in the input visual image comprises a synthetic object.

15. A method as in claim 1 wherein the abstract models comprise models of multiple physical objects.

16. A method as in claim 1 wherein the abstract models comprise a model of at least one synthetic object.

17. A method as in claim 1 additionally comprising the step of:
defining a light model specifying at least one light parameter of a light that can be used to generate the output visual image, with at least one light parameter taken from the group consisting of light position, light movement, light intensity, light color, and light orientation.

18. A method as in claim 1 additionally comprising the step of:
generating an audio stream synchronized with the output visual image stream.

19. A method as in claim 1 wherein the step (e) of generating an output visual image additionally comprises the step of:
determining at least one visual effect on at least one visual object.

20. A method as in claim 1 wherein step (b) further comprises additionally comprises specifying a visual effect upon at least one of the visual objects.

21. A method as in claim 20 wherein the visual effect comprises a visual effect selected from the group consisting of shadows, reflections, and refractions.

22. A method as in claim 20 wherein the visual effect comprises a visual effect selected from the group consisting of atmospheric and object geometry distortions.

23. A method as in claim 20 wherein the visual effect comprises an inter-object morphing effect.

24. A method as in claim 20 wherein the visual effect comprises changes to at least one object surface attribute.

25. A method as in claim 24 wherein the object surface attribute is selected from the group consisting of surface texture, reflectivity, and opacity.

26. A method as in claim 1 additionally comprising the step of:
generating an input specification and parameters for an external 3D rendering system used in the output generating step (e).

27. A method as in claim 1 additionally comprising the step of:
accepting a user input specifying how a visual image specified by more than one pixel representation and abstract model is to be blended into a single composite output visual image.

28. A method as in claim 1 wherein step (b) of defining a choreography specification additionally comprises the step of:
specifying the blending of multiple pixel representations and abstract models of a given visual object.

29. A method as in claim 28 wherein the blending specification step additionally comprises the step of:
rendering each of a plurality of abstract models first to a two-dimensional 2D pixel representation, each 2D pixel representation including a plurality of pixel data elements, and then blending the multiple 2D pixel representations.

30. A method as in claim 29 wherein step blending specification step additionally comprises the step of:
determining an image blending attribute for the visual object.

31. A method as in claim 30 wherein the image blending attribute is at least one attribute selected from the group consisting of depth from camera, image transparency, and surface normal.

32. A method as in claim 30 wherein step (e) additionally comprises the step of:
blending multiple 2D pixel representations by comparing the image blending attribute on a pixel by pixel basis.

33. A method as in claim 30 wherein step (e) additionally comprises the step of:
blending multiple 2D pixel representations by comparing the image blending attribute on a pixel region by pixel region basis.

34. A method as in claim 30 wherein step (e) additionally comprises the step of:
blending multiple 2D pixel representations by comparing the image blending attribute on a sub-pixel by sub-pixel basis.

35. A method as in claim 4 additionally comprising the step of:
during a given iteration, accepting user input specifying changes to the correlation mesh in response to display of the 2D finish representation to the user.

36. A method as in claim 1 additionally comprising the step of:
during a given iteration, accepting user input specifying changes to parameters of an automatic segmenting process that performs step (a)(i).

37. A method as in claim 1 additionally comprising the step of:

during a given iteration, accepting user input specifying changes to parameters of an automatic abstract modeling process that performs step (a)(ii).

38. A method as in claim 1 wherein step (a)(i) additionally comprises the steps of:

creating multiple pixel representation versions of a given input visual image, the multiple pixel representation versions being at different levels of image resolution; and using different ones of the pixel representation versions in given iterations of performing step (a)(i).

39. A method as in claim 38 additionally comprising the step of:

presenting an interactive display of an intermediate finish representation from a given iteration whereby a user specifies which one of the pixel representation versions are to be used in a subsequent iteration.

40. A method as in claim 38 wherein the different levels of image resolution are for different spatial resolutions.

41. A method as in claim 38 wherein the different levels of image resolution are for different color space resolutions.

42. A method as in claim 1 wherein the step of defining an abstract model additionally comprises the steps of:

creating multiple abstract model versions of a given input visual image, the abstract model versions being at different levels of modeling detail; and using different ones of the abstract model versions in given iterations of performing step (f).

43. A method as in claim 42 additionally comprising the step of:

presenting an interactive display of an intermediate finish representation from a given iteration whereby a user specifies which one of the abstract model versions are to be used in a subsequent iteration.

44. A method as in claim 42 wherein the different levels of modeling detail are different levels of geometry detail.

45. A method as in claim 42 wherein the different levels of modeling detail are different representations of surface textures.

46. A method as in claim 7 additionally comprising the step of:

providing an application programming interface that permits access to the pixel representation(s), abstract model(s) choreography specification, correlation mesh, or visual image(s).

47. A method as in claim 7 additionally comprising the step of:

modifying the output audio stream in accordance with changes made to at least one object in the virtual stage through the choreography step.

48. A data processing system for generating finish quality media from one or more source images of a scene comprising:

a scene model developed by analyzing portions of the source images, the scene model defining
  (i) a three-dimensional virtual space;
  (ii) an image-based data object containing a segmented pixel representation corresponding to a portion of at least one frame of the source images;
  (iii) an abstraction-based data object containing an abstract model for at least a portion of one of the visual objects contained in at least one of the source images, the abstraction-based data object being defined with respect to the three-dimensional virtual space;

a choreography specification for defining how the finish quality media is to be developed from the scene model and both the image-passed and abstraction-based data objects;

means for accepting user input parameters modifying how selected data objects are to be used with the choreography specification in generating the finish quality media;

an image renderer, connected to receive the scene model, the data objects, and the choreography specification as inputs, for rendering a two-dimensional visual representation of each data object;

means for accepting user inputs in response to the two-dimensional visual representation produced by the image renderer, the user inputs defining how the data objects and the choreography specification are to he used in iteratively refining the finish quality media.

49. A system as in claim 48 wherein the scene model is developed from two source images.

50. A system as in claim 49 wherein the two source images comprise two live/recorded images.

51. A system as in claim 49 wherein the two source images comprise a live/recorded image and a synthetic image.

52. A system as in claim 49 wherein the two source images comprise two synthetic images.

53. A system as in claim 48 wherein the image renderer additionally blends the rendered data objects using depth information derived from the source images.

54. A system as in claim 48 wherein the image renderer additionally blends the rendered data objects using transparency information.

55. A system as in claim 48 wherein the scene model includes image-based data objects and abstract data objects.

* * * * *

UNITED STATES PATENT AND TRADEMARK OFFICE
CERTIFICATE OF CORRECTION

PATENT NO. : 6,160,907
DATED : 12 December 2000
INVENTOR(S) : John S. Robotham, Michael T. French, Curt A. Rawley It is certified that error appears in the above-identified patent and that said Letters Patent is hereby corrected as shown below:

In Claim 20, line 66, after "further comprises" DELETE "additionally comprises".

Signed and Sealed this

Twenty-ninth Day of May, 2001

Attest:

NICHOLAS P. GODICI

*Attesting Officer*     *Acting Director of the United States Patent and Trademark Office*